(12) United States Patent
Yamazaki

(10) Patent No.: US 7,226,120 B2
(45) Date of Patent: Jun. 5, 2007

(54) SKELETON MEMBER STRUCTURE

(75) Inventor: Shouji Yamazaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 204 days.

(21) Appl. No.: 10/507,545

(22) PCT Filed: Mar. 13, 2003

(86) PCT No.: PCT/JP03/02972

§ 371 (c)(1),
(2), (4) Date: Sep. 14, 2004

(87) PCT Pub. No.: WO03/078858

PCT Pub. Date: Sep. 25, 2003

(65) Prior Publication Data

US 2005/0124730 A1   Jun. 9, 2005

(30) Foreign Application Priority Data

Mar. 15, 2002   (JP)   ............................. 2002-072964
Mar. 19, 2002   (JP)   ............................. 2002-077230

(51) Int. Cl.
*B60R 27/00* (2006.01)

(52) U.S. Cl. ........................ 296/187.03; 296/187.08; 296/187.09; 296/187.11; 296/187.12; 188/371; 188/377

(58) Field of Classification Search ........... 296/187.01, 296/187.02, 187.03, 187.04, 187.08, 187.09, 296/187.1, 187.11, 187.12; 293/132, 133, 293/134, 136, 135; 188/371, 377
See application file for complete search history.

(56) References Cited

U.S. PATENT DOCUMENTS

| | | | |
|---|---|---|---|
| 4,610,836 A | | 9/1986 | Wycech |
| 4,880,088 A | * | 11/1989 | De Oliveira ................ 188/377 |
| 5,041,472 A | | 8/1991 | Myer |
| 5,566,978 A | * | 10/1996 | Fleming et al. .......... 280/801.2 |
| 5,715,917 A | * | 2/1998 | Smallwood ................ 188/377 |
| 6,808,224 B1 | * | 10/2004 | Obara ...................... 296/146.5 |
| 6,959,894 B2 | * | 11/2005 | Hayashi ................... 244/17.11 |

FOREIGN PATENT DOCUMENTS

| | | |
|---|---|---|
| DE | 87 06 593 U | 8/1987 |
| DE | 38 16 517 A1 | 11/1989 |
| DE | 43 40 348 A1 | 6/1995 |
| DE | 299 23 774 U1 | 8/2001 |
| EP | 0 982 364 A1 | 3/2000 |
| GB | 1 492 752 | 11/1977 |
| JP | 54-25189 | 8/1979 |
| JP | 2000-046106 | 2/2000 |
| JP | 2001-130444 | 5/2001 |
| JP | 2001-349372 | 12/2001 |
| WO | WO 01/05611 * | 1/2001 |

* cited by examiner

*Primary Examiner*—Lori L. Lyjak
(74) *Attorney, Agent, or Firm*—Rankin, Hill, Porter & Clark LLP

(57) ABSTRACT

A skeleton member structure having a tubular structural member (11, 211) filled with granular materials for absorbing impact energy. The granular materials includes a granular material having a hollow portion (12a, 212a) or a porous granular material. When the skeleton member receives an impact, the granular materials are deformed or collapsed, and impact energy is stably absorbed. Since the granular materials are hollow or porous, the weight of the skeleton member filled with the granular materials is reduced.

13 Claims, 26 Drawing Sheets

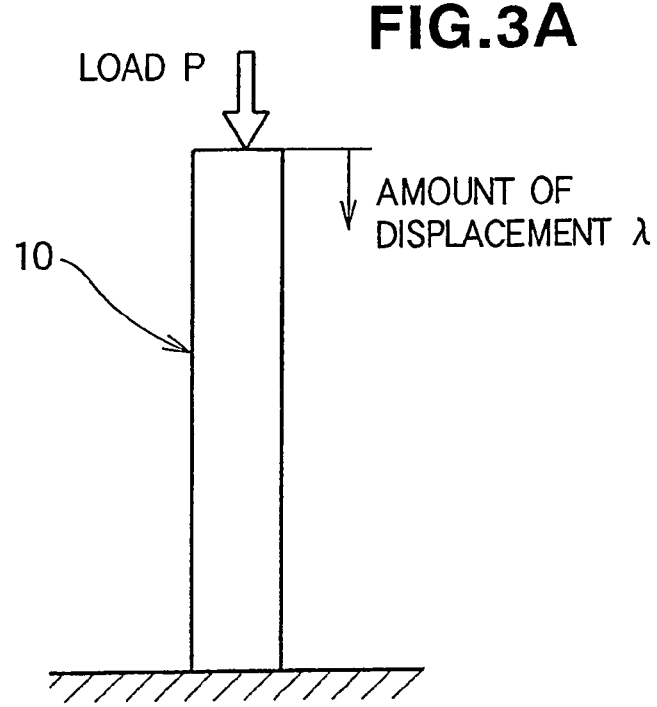
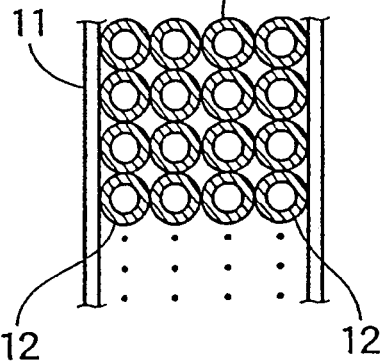
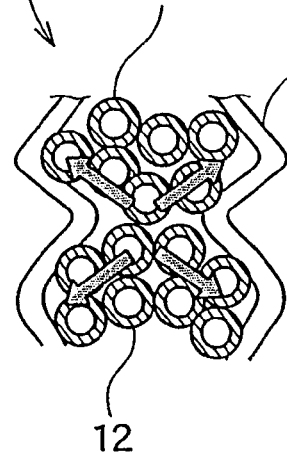
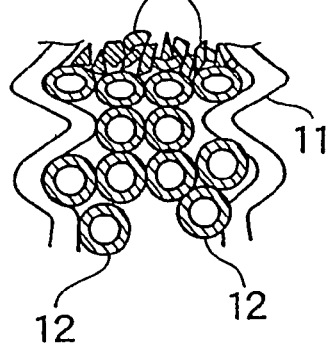
FIG.3A
FIG.3B  FIG.3C  FIG.3D

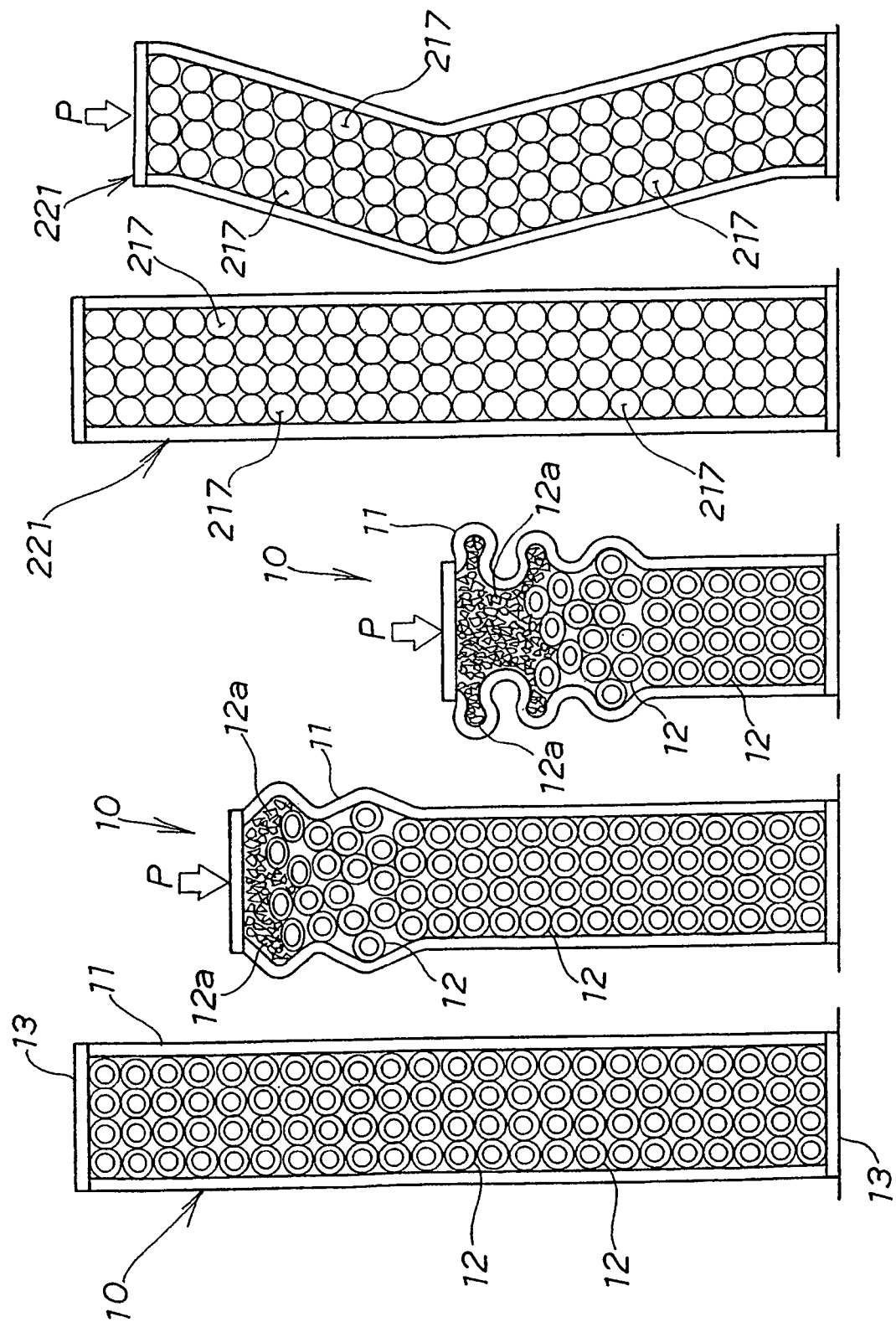

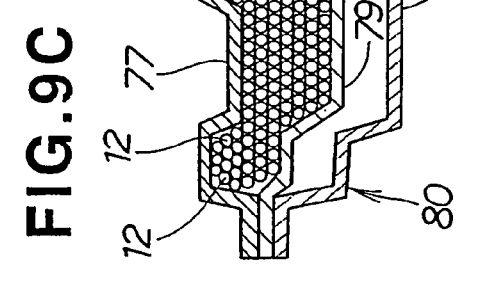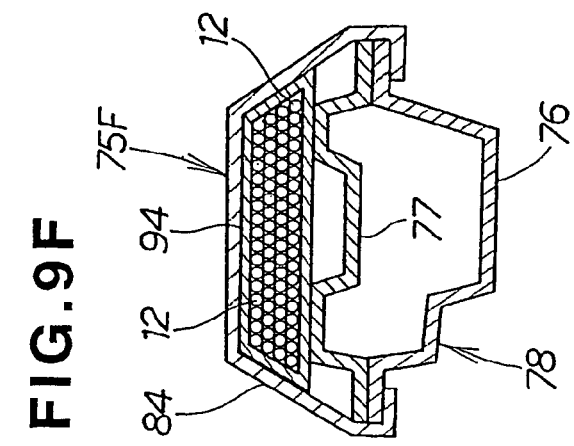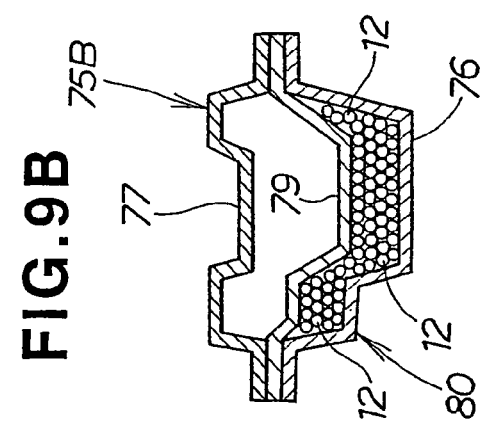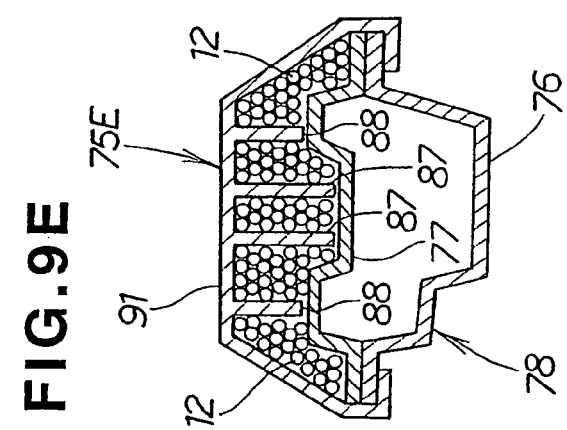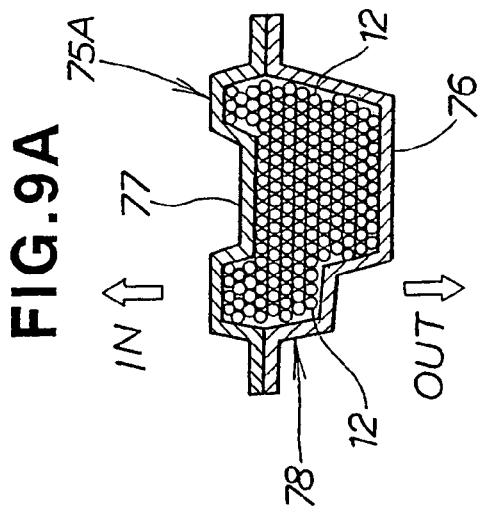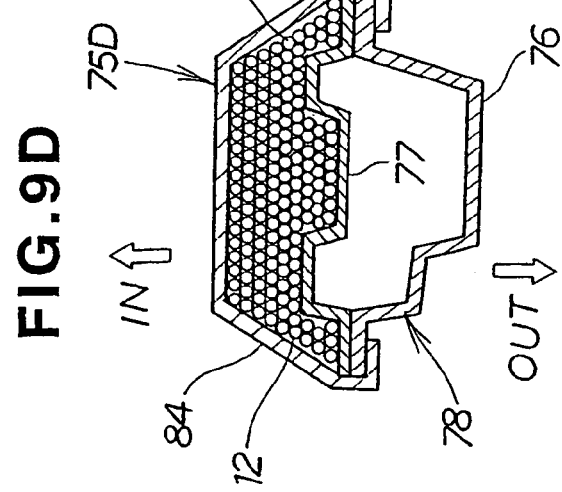

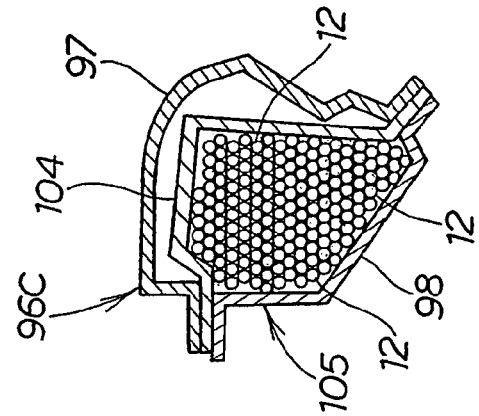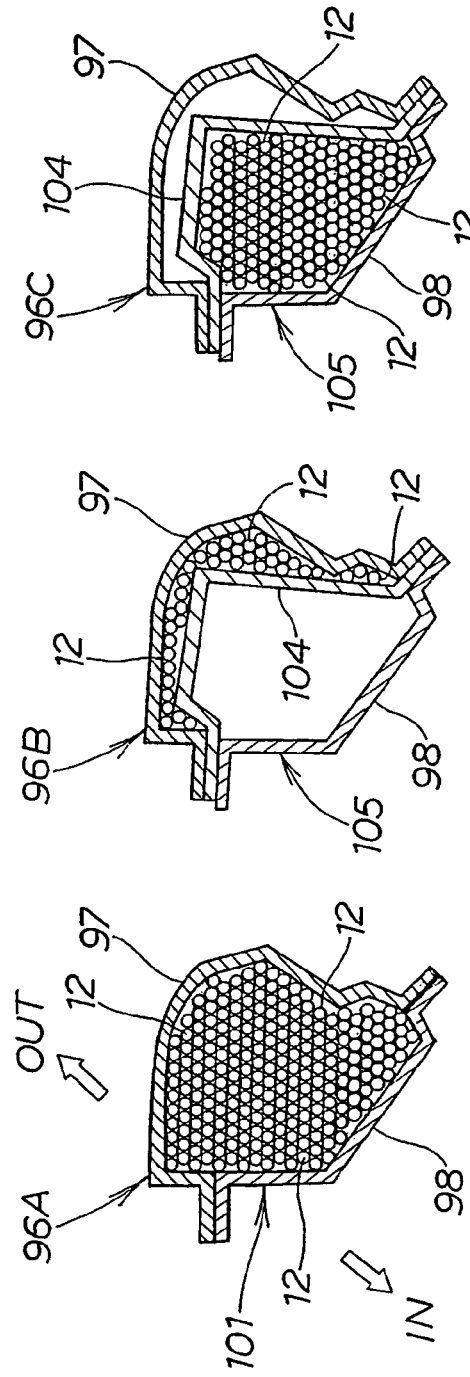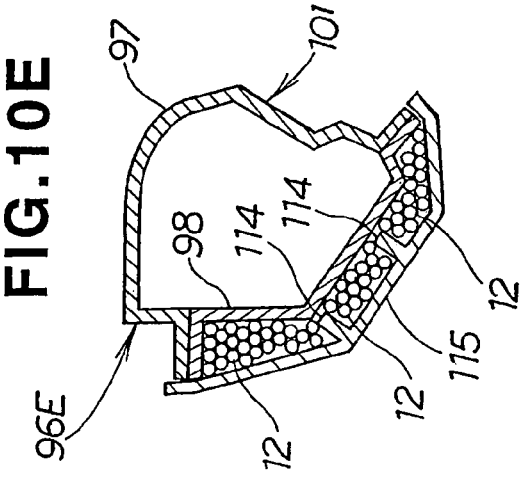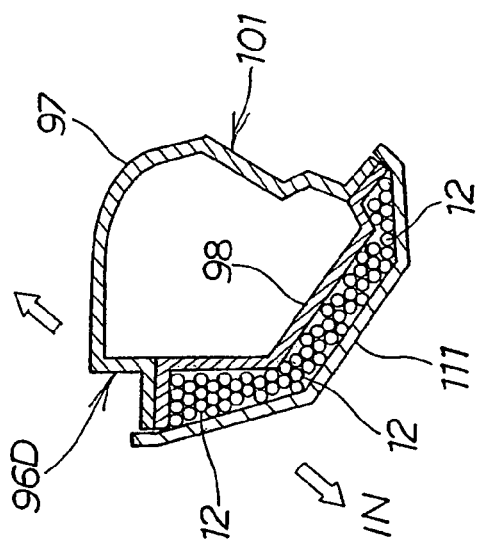

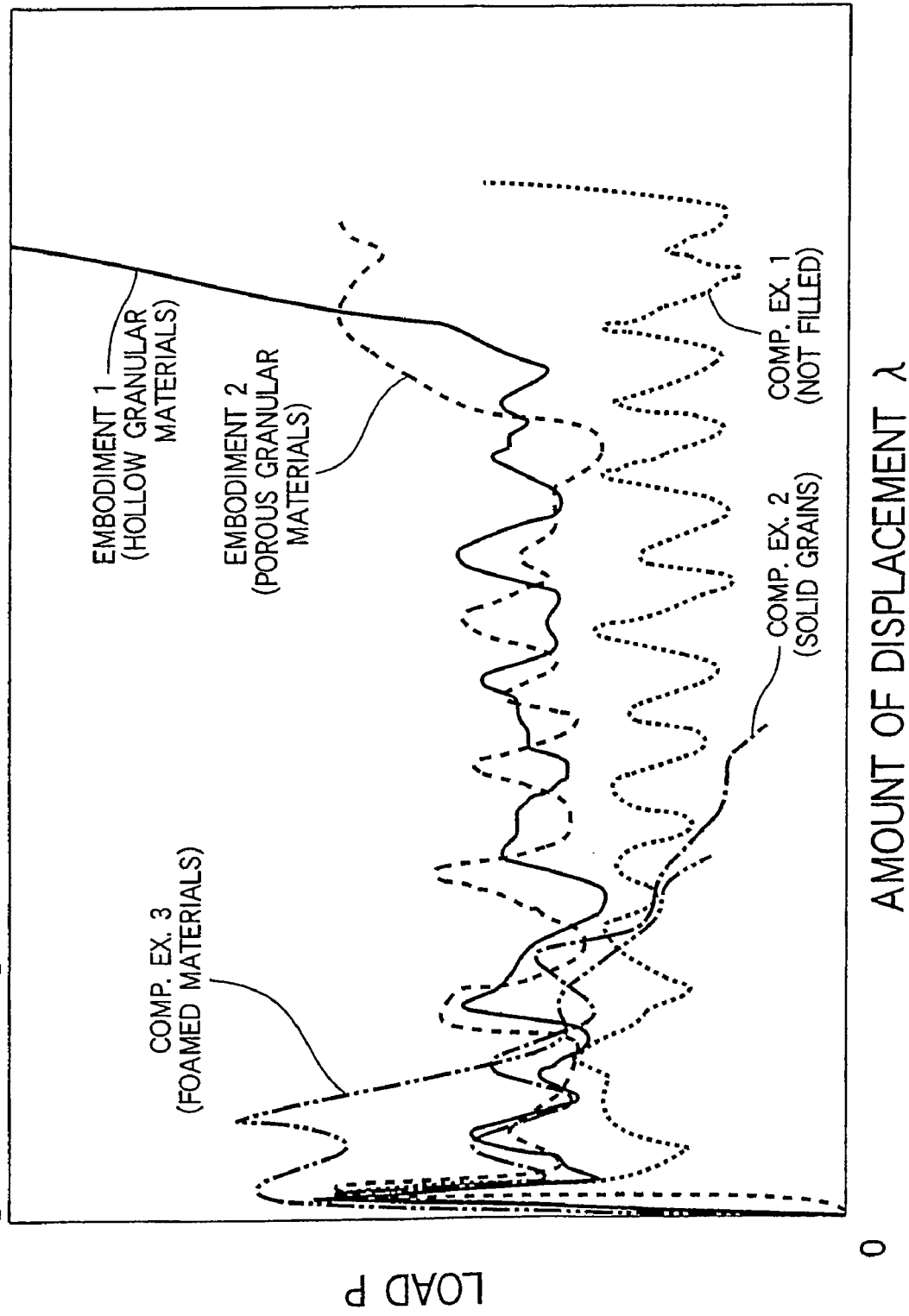

[CRUSH TEST]

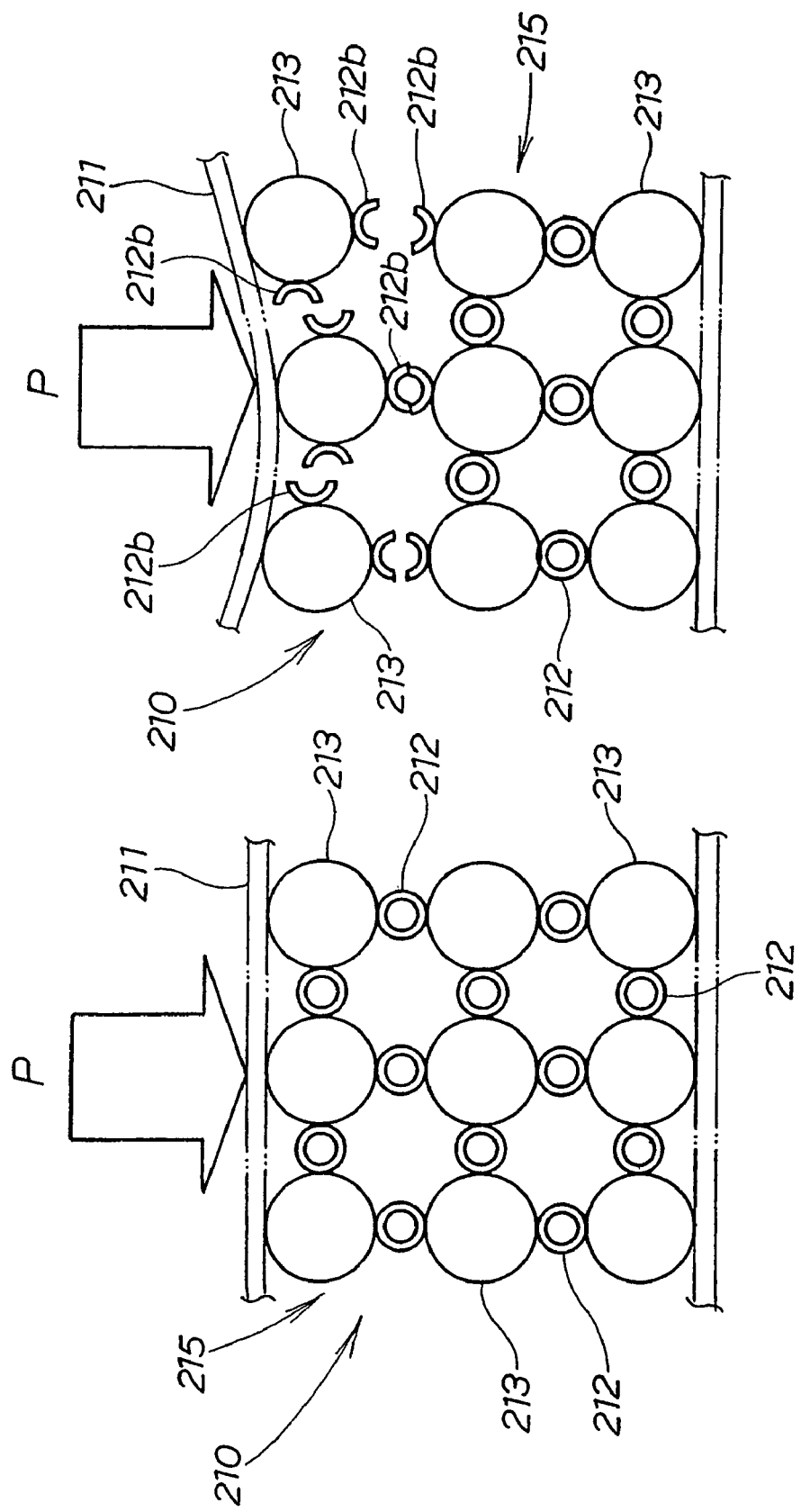

FIG.22A
(PRIOR ART)
FIG.22B
(PRIOR ART)
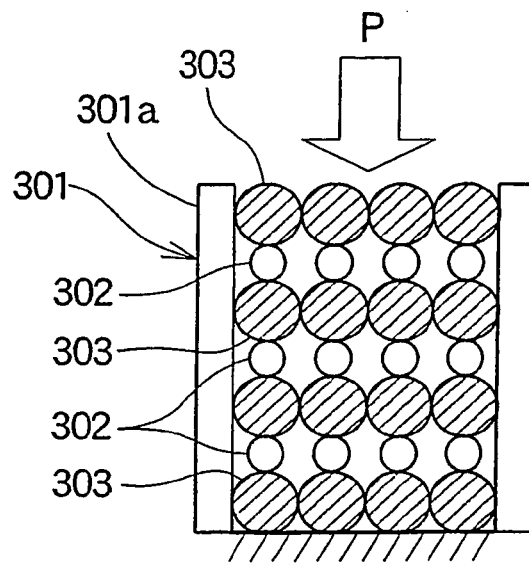
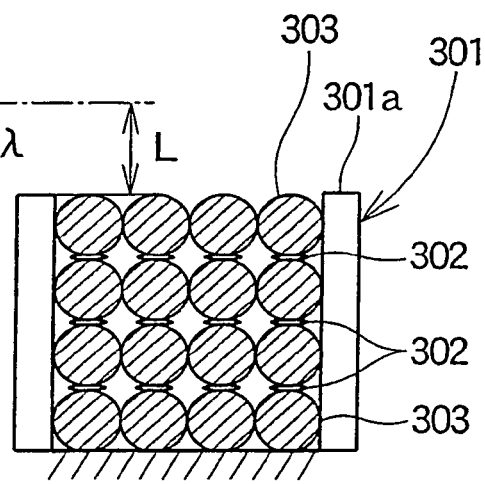
FIG.22C
(PRIOR ART)
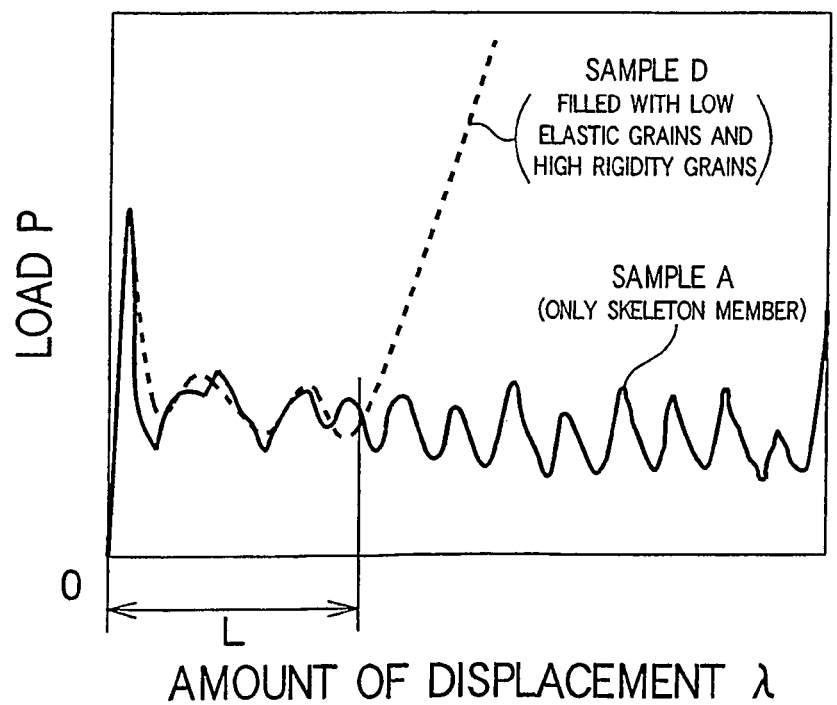

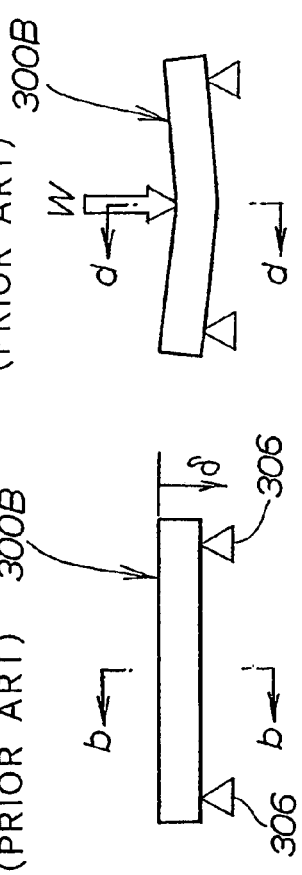
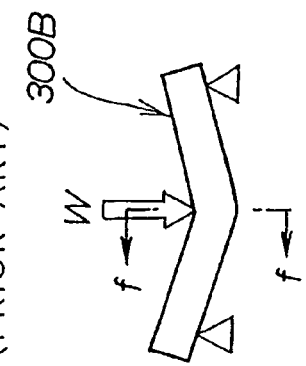
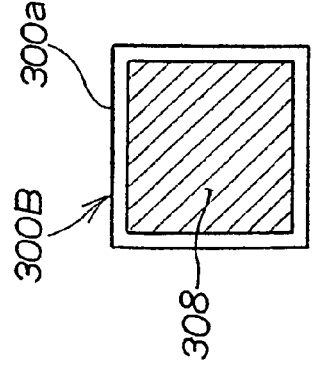
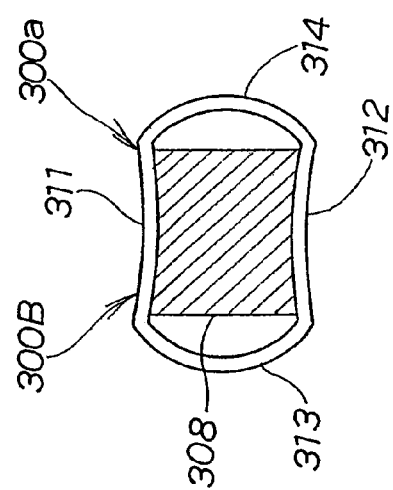
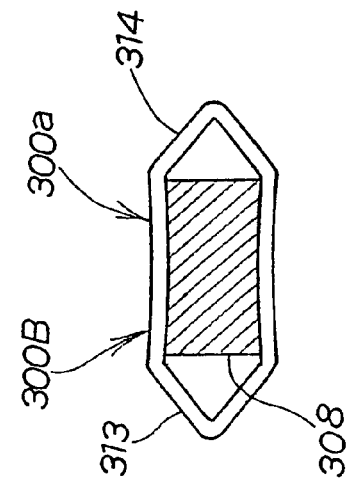
FIG.23A (PRIOR ART)
FIG.23B (PRIOR ART)
FIG.23C (PRIOR ART)
FIG.23D (PRIOR ART)
FIG.23E (PRIOR ART)
FIG.23F (PRIOR ART)

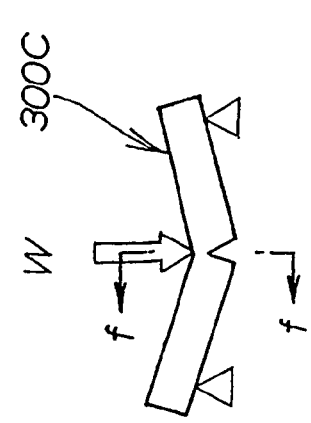
FIG. 24A (PRIOR ART)
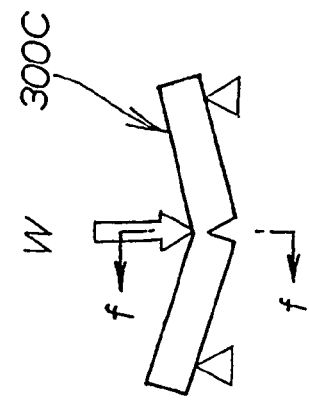
FIG. 24C (PRIOR ART)
FIG. 24E (PRIOR ART)
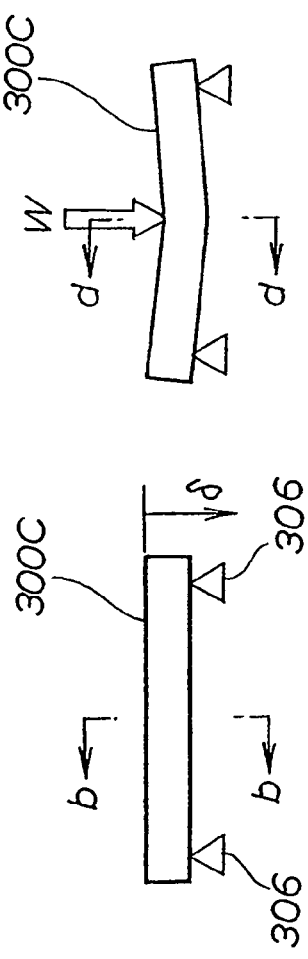
FIG. 24B (PRIOR ART)
FIG. 24D (PRIOR ART)
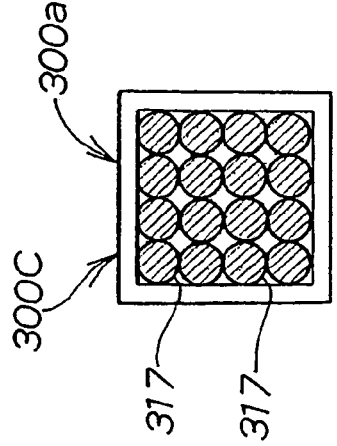
FIG. 24F (PRIOR ART)
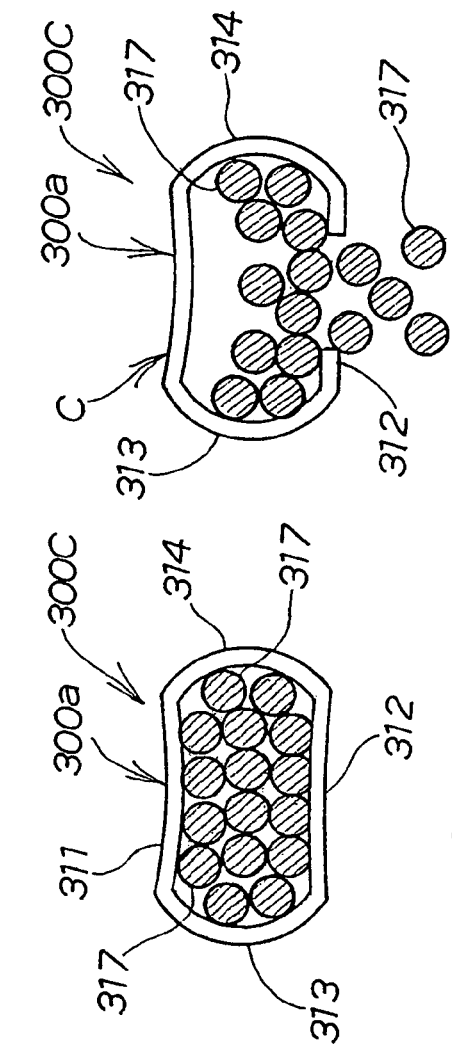

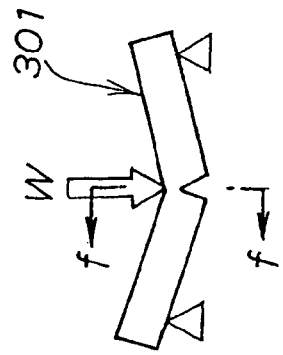
FIG. 25A (PRIOR ART)
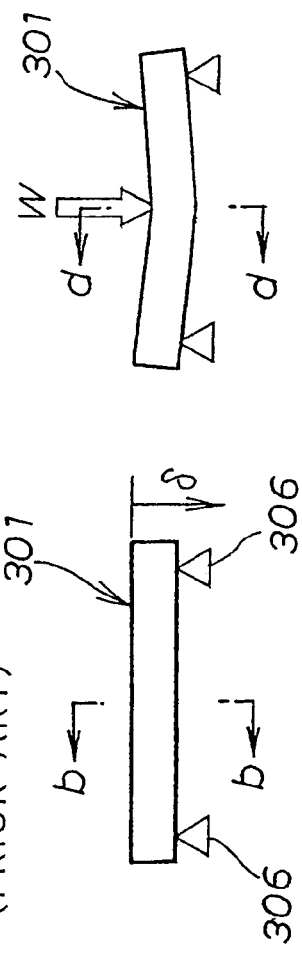
FIG. 25B (PRIOR ART)
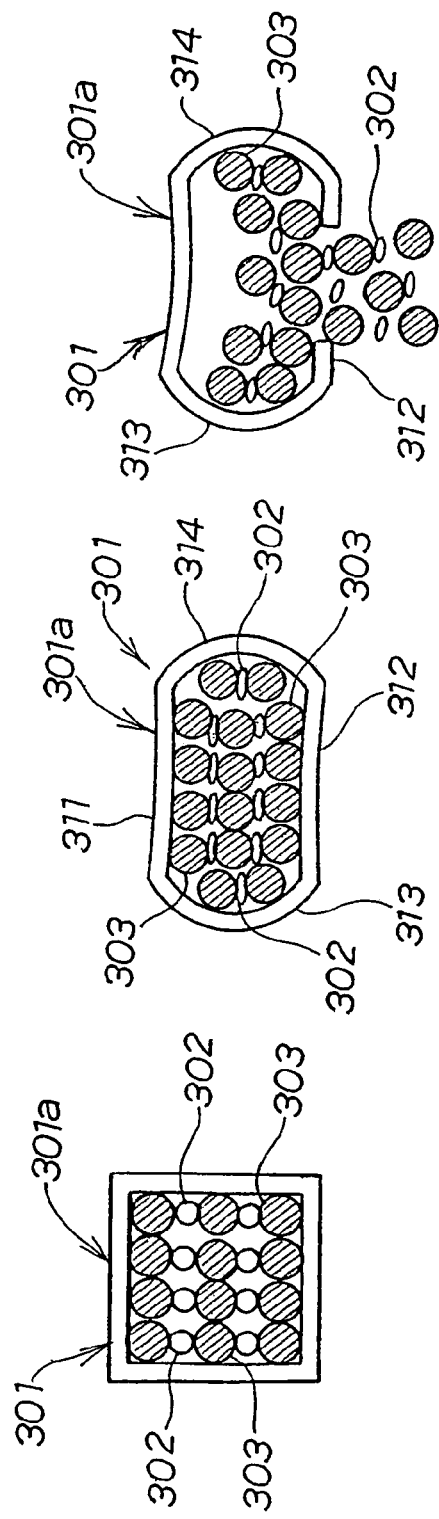
FIG. 25C (PRIOR ART)
FIG. 25D (PRIOR ART)
FIG. 25E (PRIOR ART)
FIG. 25F (PRIOR ART)

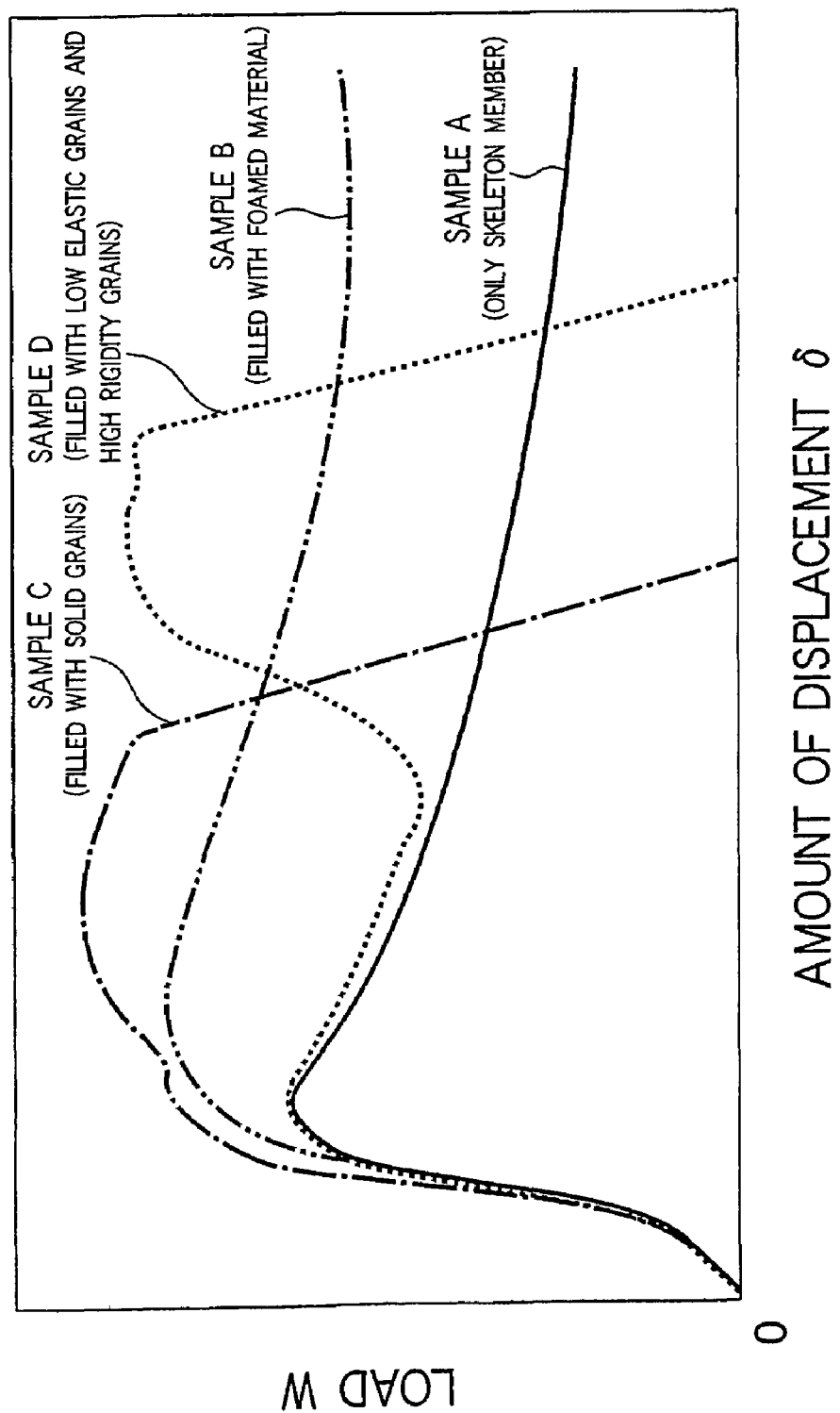

SKELETON MEMBER STRUCTURE

TECHNICAL FIELD

This invention relates to a skeleton member structure which is imparted with improved shock absorbing capability without increasing its weight. The invention also relates to a method for forming solidified granular materials.

BACKGROUND ART

Skeleton member structures having skeleton or structural members filled with filling materials are know from, for example, (1) paper pre-published for 2001 JSAE (Society of Automotive Engineers of Japan) Spring General Meeting, entitled "ATTEMPT TO COPE WITH BOTH CRASH-WORTHINESS AND WEIGHT REDUCTION" (hereinafter called Prior Art 1), (2) science paper, 1986, The university of Manchester, England, "STATIC AND DYNAMIC AXIAL CRUSHING OF FOAM-FILLED SHEET METAL TUBES" (hereinafter called Prior Art 2), (3) paper published in Automobile Engineering, Vol. 55, April, 2001, "DEVELOPMENT OF A METHOD OF ENHANCING BODY FRAME STRENGTH USING STRUCTURAL FOAM" (hereinafter called Prior Art 3), (4) Japanese Patent Laid-Open Publication No. 2001-130444 entitled "IMPACT ENERGY ABSORBING MEMBER" (hereinafter called Prior Art 4), and (5) Japanese Patent Laid-Open Publication No. 2000-46106 entitled "DAMPING PANEL" (hereinafter called Prior Art 5).

Methods for forming solidified granular materials are know from, for example, (6) U.S. Pat. No. 4,610,836 entitled "METHOD OF REINFORCING A STRUCTURAL MEMBER" (hereinafter called Prior Art 6), (7) the art for solidifying a granular material by use of a resin material (hereinafter called Prior Art 7), (8) the art for solidifying a granular material by a crosslinking liquid film (hereinafter called Prior Art 8), and (9) the art for solidifying a granular material in itself (hereinafter called Prior Art 9).

Prior Art 1 is directed to the art of filling the skeleton member of an automobile with a foamed filling material to realize weight reduction while ensuring absorption energy during a collision.

In Prior Art 2, FIG. 3(b) (ii) at pp. 301 shows an example in which a tube of square cross section filled with polyurethane foam is deformed.

Prior Art 3 discloses the art of filling a part of the interior of a frame with a foamed resin to restrain local buckling deformation of the frame by dispersing the energy of a collision.

(4) Prior Art 4 describes in paragraph [0025] at page 4 that "in order that the impact energy absorbing member can easily receive an impact load in the surface direction thereof, in the case where the impact energy absorbing member has a cavity portion, it is preferable that fitting matter such as grains, a foamed material or a core be fitted into the interior of the impact energy absorbing member to enhance the longitudinal rigidity of the impact energy absorbing member". In addition, FIG. 14 of the same publication discloses an impact energy absorbing member having an interior in which fitting matter is fitted.

(a) and (b) of FIG. 1 of Prior Art 5 illustrate a damping panel which is filled with a mixture of high rigidity grains and low elastic grains for absorbing vibration energy according to elastic deformation.

FIG. 2 of Prior Art 6 illustrates a structure in which a skeleton member is filled with adhesive-coated glass microspheres wrapped in cloth made of glass fiber. U.S. Pat. No. 4,695,343 also discloses a similar structure.

Prior Art 7 will be described below with reference to FIGS. 27 and 28 hereof.

FIG. 27 shows a structural member 402 in which a skeleton member 400 which constitutes a skeleton structure is filled with a solidified granular material 401.

The solidified granular material 401 shown in FIG. 28 is made of granular materials 403 and a resin material 404 with which the spaces among the granular materials 403 are filled to solidify the granular materials 403.

Prior Art 8 will be described below with reference to FIG. 29 hereof.

The solidified granular material 410 shown in FIG. 29 has a structure in which adjacent ones of the granular materials 403 are bonded to one another by a crosslinking liquid film 411. In the formation of this bonding structure, after moisture or the like has been added to the granular materials 403, the granular materials 403 are pressed and heated to form the crosslinking liquid film 411, thereby forming the solidified granular material 410.

The solidified granular material 420 shown in FIG. 30 is matter in which adjacent ones of the granular materials 403 are bonded to one another by melting the surfaces of the granular materials 403. Reference numeral 421 denotes a solidified portion in which the surfaces of the granular materials 403 are solidified after having been melted.

Prior Arts 1 to 3 have a structure in which a skeleton member is filled with a foamed material, but has the following problem. This problem will be described below with reference to the graphs shown in FIGS. 20A and 20B.

FIG. 20A is a graph for explaining the relationship between the foaming ratio of a foamed material and the buckling load at which buckling occurs when a compressive load is applied to a structural member in the axial direction thereof, and the vertical axis represents the buckling load and the horizontal axis represents the foaming ratio. According to this graph, when the buckling load of the structural member is to be increased, it is necessary to reduce the foaming ratio.

FIG. 20B is a graph for explaining the relationship between the foaming ratio of the foamed material and the weight of the structural member, and the vertical and horizontal axes represent the weight and the foaming ratio, respectively. According to this graph, as the foaming ratio is made smaller, the weight of the structural member increases.

It can be seen from these graphs that in the range of foaming ratios not higher than a foaming ratio at which a predetermined buckling load b is ensured (in the foamed-material effective area shown in FIG. 20B), the weight becomes large and a reduction in the weight of the structural member becomes difficult.

Crush tests of structural members which are respectively filled with the foamed materials disclosed in the aforementioned Prior Arts 1 to 3 and the grains disclosed in Prior Art 4, for example, solid powder will be described below with reference to FIGS. 21A, 21B and 21C.

In FIG. 21A, an axial compressive load P as shown by an arrow is applied to a structural member 300 having a tubular skeleton member 300a filled with a foamed material or solid grains, thereby forcedly deforming the structural member 300.

In FIG. 21B, letting λ be the amount of deformation of the structural member 300, and as the amount of deformation λ increases, the structural member 300 is buckled and deformed into the Z-shaped or dogleg-shaped configuration shown in FIG. 21B.

FIG. 21C is a graph for explaining the relationship between the amount of deformation λ and the load P with the structural member 300 deformed as described above, and the vertical and horizontal axes represent the load P and the amount of deformation λ, respectively. In addition, three kinds of samples are used: a sample A which has an interior not filled with a filling material and uses only a skeleton member, a sample B filled with a foamed material, and a sample C filled with solid grains.

When the amount of deformation λ is small, the sample B (filled with a foamed material) generates a larger load than the sample A, and as the amount of deformation λ becomes larger, the load P sharply decreases.

Regarding the sample C (filled with solid grains), as the amount of deformation λ becomes comparatively larger, the load P sharply decreases. This is because in each of the samples B and C, since the foamed material or the solid grains are not easily crushed in an early stage of deformation, the internal pressure of the structural member excessively rises and is buckled into a Z-shaped or dogleg-shaped configuration and the load P is sharply decreased by this buckling.

Then, a crush test of the structural member of Prior Art 5 that is filled with high rigidity grains and low elastic grains will be described below with reference to FIGS. 22A, 22B and 22C.

In FIG. 22A, the structural member 301 is a member in which a tubular skeleton member 301a is filled with a multiplicity of low elastic grains 302 and a multiplicity of high rigidity grains 303. First, the load P which is an axial compressive load is applied to the structural member 301, thereby forcedly deforming the structural member 301. As a result, the low elastic grains 302 are gradually deformed as shown in FIG. 22B. When the amount of deformation λ of the structural member 301 reaches L, the low elastic grains 302 are nearly completely crushed, and then the load P directly acts on the high rigidity grains 303.

FIG. 22C is a graph for explaining the relationship between the amount of deformation λ of the structural member and the load P when the structural member 301 is deformed as described above, and the vertical and horizontal axes represent the load P and the amount of deformation λ, respectively. In addition, the sample A shown by a solid line includes only the skeleton member shown in FIG. 21C, and a sample D shown by a dashed line is the structural member 301 described with reference to FIGS. 22A and 22B.

The load P of the sample D is nearly equal to that of the sample A until the amount of deformation λ reaches L, but when the amount of deformation λ exceeds L, the load P sharply increases. This is because, as described above, when the amount of deformation λ exceeds L, the load P acts on the high rigidity grains which are hardly crushed, and the load P sharply increases. When the load P is made to act further, the sample D is buckled and deformed into a Z- or doglegged-shape similar to that shown in FIG. 21B, and the load P sharply decreases.

Then, a bending test of a structural member filled with a filling material will be described with reference to FIGS. 23A to 23F.

FIG. 23A shows the state in which a structural member 300B having the skeleton member 300a filled with a foamed material (the sample B shown in FIG. 21C) is supported at two supporting points 306, 306. δ denotes the amount of deformation of the structural member 300B to which a load is applied (the definition of δ is the same in the following description).

FIG. 23B shows the fact that the skeleton member 300a of the structural member 300B is filled with a foamed material 308.

In FIG. 23C, when a load W is applied to the structural member 300B in a direction perpendicular to the axis of a structural part 3200B, i.e., in the direction of an arrow, the structural member 300B is bent downwardly.

As shown in FIG. 23D, the granular materials 308 between a top side 311 and a bottom side 312 of the skeleton member 300a are compressed and lateral sides 313 and 314 of the structural member 300a are swollen outwardly, whereby the lateral sides 313 and 314 peel off the foamed material 308.

As shown in FIG. 23E, when the load W is further applied to the structural member 300B, the structural member 300B is further deformed, and as shown in FIG. 23F, the structural member 300B is crushed to a further extent in the vertical direction, and the lateral sides 313 and 314 are swollen sideways to a further extent.

As shown in FIGS. 23D and 23F, as deformation proceeds, the lateral sides 313 and 314 of the skeleton member 300a peel off the foamed material 308, so that the foamed material 308 becomes unable to easily restrain the deformation of the structural member 300B.

Then, a bending test of a skeleton member filled with solid grains will be described with reference to FIGS. 24A to 24F.

FIG. 24A shows the state in which a structural member 300C having the skeleton member 300a filled with solid grains (the sample C shown in FIG. 21C) is supported at two supporting points 306, 306.

FIG. 24B shows the fact that the structural member 300a is filled with solid grains 317.

As shown in FIG. 24C, when the load W is applied to the structural member 300C in a direction perpendicular to the axis of the structural member 300C, i.e., in the direction of a white arrow, the structural member 300C is bent downwardly. As shown in FIG. 24D, the solid grains 317 between the top side 311 and the bottom side 312 of the structural member 300a are compressed and the lateral sides 313 and 314 of the skeleton member 300a are swollen outwardly, whereby the solid grains 317 spread sideways according to the swelling of the lateral sides 313 and 314.

As shown in FIG. 24E, when the load W is further applied to the structural member 300C, the structural member 300C is further deformed and the bottom side of the structural member 300C is broken. Namely, as shown in FIG. 24F, the structural member 300C is crushed to a further extent in the vertical direction and the lateral sides 313 and 314 are swollen sideways to a further extent, so that the internal pressure becomes excessively large and the bottom side 312 is broken.

Accordingly, when the skeleton member 300a is broken, the flexural rigidity of the structural member 300C becomes extremely low.

FIGS. 24A to 25F show a bending test of a structural member having a skeleton member filled with low elastic grains and high rigidity grains.

FIG. 25A shows the state in which the structural member 301 the skeleton member 301a filled with low elastic grains and high rigidity grains (the sample D shown in FIG. 22C) is supported at the two supporting points 306, 306.

FIG. 25B shows the fact that the skeleton member 301a is filled with the low elastic grains 302 and the high rigidity grains 303.

As shown in FIG. 25C, when the load W is applied to the structural member 301 in a direction perpendicular to the axis of the structural member 301, i.e., in the direction of an arrow, the structural member 301 is bent downwardly, and as shown in FIG. 25D, the load acts on the low elastic grains 302 and the high rigidity grains 303 between the top side 311 and the bottom side 312 of the skeleton member 301a, and the low elastic grains 302 are shrunk and the lateral sides 313 and 314 of the skeleton member 301a are swollen outwardly, whereby the low elastic grains 302 and the high rigidity grains 303 spread sideways according to the swelling of the lateral sides 313 and 314.

As shown in FIG. 25E, when the load W is further applied to the structural member 301, the structural member 301 is further deformed and the bottom side of the structural member 301 is broken. Namely, as shown in FIG. 25F, the structural member 301 is crushed to a further extent in the vertical direction and the lateral sides 313 and 314 are swollen sideways to a further extent, so that the internal pressure becomes excessively large and the bottom side 312 is broken.

Accordingly, when the skeleton member 301a is broken, the flexural rigidity of the structural member 301 becomes extremely low.

The results of the conventional structural members filled with the respective filling materials are shown in the graph of FIG. 26. FIG. 26 shows the results of the sample A and the samples B to D shown in FIGS. 23 to 25. The vertical axis represents the load W applied to the structural member, while the horizontal axis represents the amount of deformation δ.

The load W of the sample B is generally large with respect to that of the sample A, but as the amount of deformation δ increases, the load W gradually decreases.

In the case of the sample C and the sample D, the value of the load W increases in an early stage of deformation, but since the load W sharply decreases while the amount of deformation δ is small, the maximum amount of deformation δ is small.

Absorption energy capable of being absorbed by a structural member during a vehicle collision is nearly equivalent to the result obtained by, letting δ be a small amount of deformation, integrating the load W corresponding to this small amount of deformation from zero to maximum in terms of the amount of deformation δ, i.e., the area below each of the curves. Accordingly, if the load W for each value of the amount of deformation δ can be maintained at a large value and the maximum amount of deformation δ can be increased, the absorption energy of the structural member during the collision can be made large. In addition, if the load W can be made constant, impact energy can be stable absorbed.

In the case of the above-described sample B, the maximum amount of deformation δ is large, but the load W for each value of the amount of deformation δ is not sufficiently large, whereas in the case the samples C and D, the maximum load W is large, but the maximum amount of deformation δ is small. Accordingly, any of the samples B to D is small in total absorption energy, i.e., cannot sufficiently absorbe impact energy.

In the case of the sample C and the sample D, the variation of the load W is large, so that the absorption of impact energy does not stabilize.

In the structure disclosed in Prior Art 6, since individual microspheres are bonded together by an adhesive, solid matter having high rigidity in whole can be formed. However, for example when an impact acts on a skeleton member, if the deformation of each of the microspheres is small, load occurring in the skeleton member sharply increases, so that impact energy cannot be sufficiently absorbed.

In Prior Art 7, as shown in FIGS. 27 and 28, since the granular materials 403 are solidified by the resin material 404, the rigidity of the structural member 402 increases, but the amount of the resin material 404 becomes large to increase the weight of the structural member 402.

In Prior Art 8, as shown in FIG. 29, the mutual bonding of the granular materials 403 by the crosslinking liquid film 411 is based on surface tension, so that bonding force is weak and a large solidified granular material is difficult to form as the solidified granular material 410.

In Prior Art 9, as shown in FIG. 30, the granular materials 403 are solidified by melting the surfaces of the granular materials 403 themselves, so that adjacent ones of the granular materials 403 can be firmly bonded to one another. However, in the case where the granular materials 403 are ceramics, for example, glass, silicon dioxide ($SiO_2$) and aluminum oxide ($Al_2O_3$: alumina), the granular materials 403 must be heated at a very high temperature. In addition, since special equipment is needed, it is not easy to form the solidified granular material 420.

Accordingly, there is a demand for a skeleton member structure capable of stable absorbing more impact energy in spite of an restrained increase in weight.

BRIEF SUMMARY OF THE INVENTION

According to one aspect of the present invention, there is provided a skeleton member structure characterized by a skeleton member and granular materials having hollow portions or porous granular materials, a space inside the skeleton member and/or a space surrounded by the skeleton member and a surrounding panel member being filled with the granular materials.

When the space is to be filled with the granular materials, preferably, the space is directly filled with the granular materials or a filling member previously filled with the granular materials is fitted into the skeleton member.

The skeleton member preferably includes a plurality of frames, side sills, cross members, pillars, beams and rails all of which are used for an automobile.

An increase in the weight of the skeleton member can be restrained by the granular materials having the hollow portions or the porous granular materials. When the skeleton member receives an impact, owing to the frictional force among the granular materials and the deformation or the collapse of the granular materials themselves, the deformation of the skeleton member can be made to proceed gradually from a load-acting side and smoothly while a large load is being generated, whereby far larger impact energy can be absorbed more stable.

It is preferable that the skeleton member structure further includes second granular materials, and adjacent ones of the second granular materials are bonded to one another by the hollow first granular materials. The first granular materials are made of a resin material. The second granular materials may also be solid, and is preferably formed of hollow or porous granular materials.

Since the second granular materials are bonded to one another by the hollow first granular materials, the weight of the skeleton member structure can be reduced. In addition, the mutual bonding of the second granular materials can be made firm, and when the skeleton member receives impact, the first granular materials can be collapsed, whereby it is possible to highly efficiently absorb far more impact energy.

According to another aspect of the present invention, there is provided a method for forming a solidified granular material fitted in a skeleton member and/or in a spaced surrounded by the skeleton member and a surrounding panel member, which method is characterized by a step of mixing first granular materials which are hollow and made of a resin, and second granular materials, and a step of bonding adjacent ones of the second granular materials to one another via the first granular materials by melting surfaces of the first granular materials.

The first granular materials and the second granular materials can be firmly bonded to one another by melting the surfaces of the first granular materials which are hollow and made of a resin, whereby it is possible to form a lightweight large-sized solidified granular material. In addition, the surfaces of the resin-made first granular materials can be melted at a low temperature, whereby the solidified granular material can be easily formed without the need for special equipment.

BRIEF DESCRIPTION OF THE DRAWINGS

FIGS. 3A to 3D show the crushed state of a structural member according to the first embodiment of the invention;

FIGS. 4A, 4B and 4C are views showing the deformed state in a crush test of the structural member of the first embodiment, and FIGS. 4D and 4E are views showing the deformed state of a comparative example;

FIGS. 9A to 9F are cross-sectional views showing a plurality of examples in each of which the vehicle skeleton structure according to the invention is adopted in the center pillar of the vehicle;

FIGS. 10A to 10E are cross-sectional views showing a plurality of examples in each of which the vehicle skeleton structure according to the invention is adopted in the roof side rail of the vehicle;

FIG. 12 is a graph showing the results of crush tests of structural members according to the invention as well as comparative examples;

FIGS. 17A and 17B are views showing the state of deformation of the solidified granular material shown in FIG. 15 when a load is applied thereto;

FIGS. 22A and 22B show the state of deformation of a conventional structural member having a tubular skeleton member filled with low elastic grains and high rigidity grains when a compressive load is applied to the conventional structural member in the axial direction, and FIG. 22C is a graph showing the relationship between the amount of deformation of the structural member and the compressive load;

FIGS. 23A to 23F are views showing the state of deformation of a conventional structural member having a skeleton member filled with a foamed material when a load is applied to perform a bending test on the structural member;

FIGS. 24A to 24F are views showing the state of deformation of a conventional structural member having a skeleton member filled with solid grains when a load is applied to perform a bending test on the structural member;

FIGS. 25A to 25F are views showing the state of deformation of a conventional structural member having a skeleton member filled with low elastic grains and high rigidity grains when a load is applied to perform a bending test on the structural member;

FIG. 26 is a graph showing the result of the bending tests of the conventional structural members having the skeleton member filled with the respective filling materials;

DETAILED DESCRIPTION OF THE INVENTION

Figure 1:
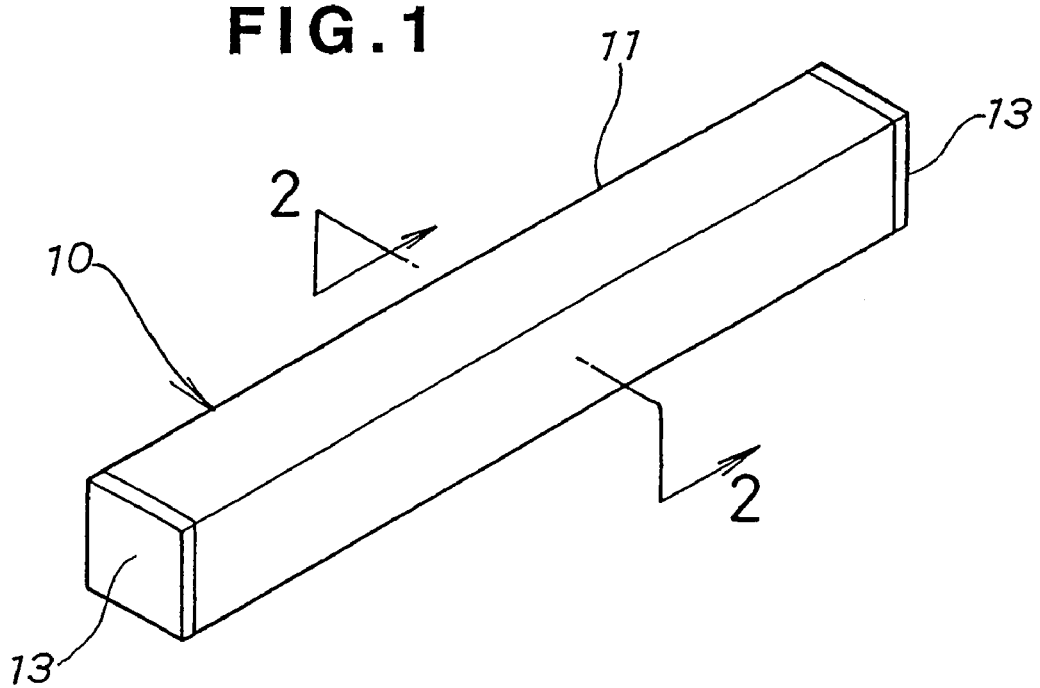
FIG. 1 is a perspective view of a skeleton member structure according to a first embodiment of the present invention.

The structural member 10 shown in FIG. 1 corresponds to a member which forms the skeleton or frame structure of a vehicle, and is a sample which is fabricated for testing purposes to grasp the impact energy absorbing performance of the vehicle skeleton structure.

Figure 2:
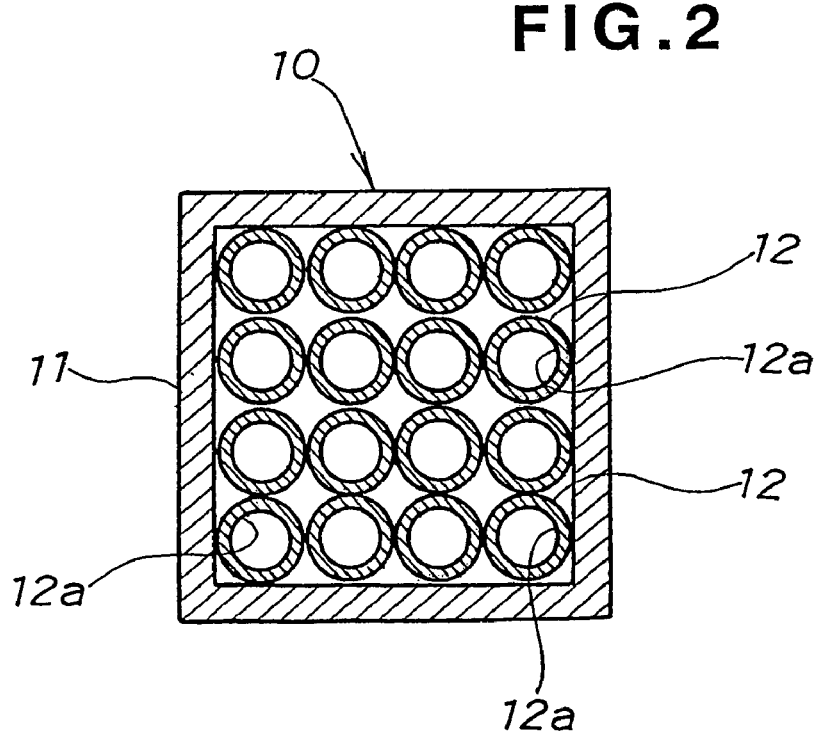
FIG. 2 is a magnified cross-sectional view taken along line 2-2 of FIG. 1.

As shown in FIG. 2, the structural member 10 is made of a skeleton member 11 having a tubular shape and a plurality of hollow granules or granular materials 12 with which the skeleton member 11 is filled. Reference numeral 12a denotes a hollow portion. The granular materials 12 are considerably small compared to the skeleton member 11, but, in FIG. 2, are shown at a magnified scale for the convenience of description. The skeleton member 11 includes end-closing members 13 and 13 as shown in FIG. 1.

Silicon dioxide ($SiO_2$), aluminum oxide ($Al_2O_3$: alumina), silica alumina, resin, glass or ceramics is suitably used as the granular materials 12.

FIGS. 3A to 3D show the state in which the structural member according to the invention is crushed.

FIG. 3A shows the state in which a load P which serves as an axial compressive load is applied to the structural member 10 to deform the structural member 10. The amount of displacement of the structural member 10 at this time is λ.

FIG. 3B shows the cross-sectional state of the structural member 10 before the axial compressive load is applied to the structural member 10.

As shown in FIG. 3C, when the load is applied to the structural member 10, adjacent ones of the granular materials 12 are brought into strong contact with one another and travel while generating large frictional forces, so that large resistance occurs due to the deformation of the structural member 10.

As shown in FIG. 3D, when the load continues to be applied, small deformation and collapse (12b denotes collapsed pieces resulting from the collapse of the granular materials 12) occurs in the granular materials 12 in the structural member 10 on the side on which the load is acting, and restrains a sharp increase in the internal pressure of the skeleton member 11, whereby Z-shaped or dogleg-shaped buckling deformation can be prevented from occurring in the skeleton member 11.

FIGS. 4A to 4E show deformed states of structural members in crush tests thereof. FIGS. 4A, 4B and 4C show an embodiment of the invention, and FIGS. 4D and 4E show a comparative example. First, the embodiment will be described.

FIG. 4A shows a state before deformation. As shown in FIG. 4B, when the load P which serves as an axial compressive load is applied to the structural member 10 in the state of FIG. 4A, the granular materials 12 start to be deformed to a small extent at one end side (i.e., the top side) where the load P to the structural member 10 is applied, finally resulting in the collapse of the granular materials 12. Contrarily, deformation hardly occurs at the other end side (i.e., the bottom side) of the structural member 10.

As shown in FIG. 4C, when the load P continues to be applied, the small deformation and collapse of the granular materials 12 described above with reference to FIG. 4B gradually proceeds downwardly, and the structural member 10 are nearly regularly and smoothly deformed into a bellows-like shape.

Then, the comparative example will be described.

FIG. 4D shows a state before deformation of a structural member 221 which is the sample C shown in FIG. 24F (a structural member filled with solid grains). As shown in FIG. 4E, when the load P which serves as an axial compressive load is applied during the state of FIG. 4D, solid grains 217 with which the structural member 221 is filled are hardly crushed and the load P sharply increases, so that the structural member 221 start to be buckled and deformed into a dog-leg-like shape or a Z-like shape (not shown). After that, the load P sharply decreases.

As described above, in the embodiment of the invention, since the structural member 10 is crushed in order from one end thereof, the structural member 10 can ensure a large amount of displacement while retaining a nearly constant large reaction force, and can highly efficiently absorb energy applied to the structural member 10.

On the other hand, in the comparative example, the load P becomes excessively large in an early stage of deformation, and when the structural member 221 is buckled and deformed into a Z-like or dog-leg-like shape, the load P sharply decreases, so that the structural member 221 cannot effectively absorb energy which accompanies deformation.

FIGS. 5A to 5F show a bending test of the structural member according to the invention.

Figure 5A:
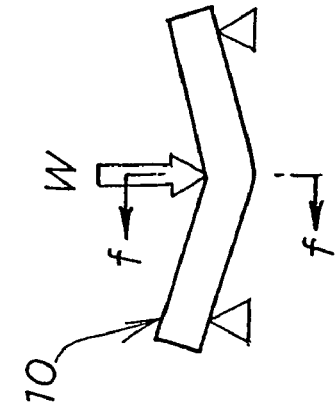
FIGS. 5A to 5F are views showing the deformed state in a bending test of the structural member of the first embodiment.

FIG. 5A shows the state in which the structural member 10 is supported at two supporting points 15, 15. δ denotes the amount of deformation of the structural member 10 to which a load is applied.

Figure 5C:
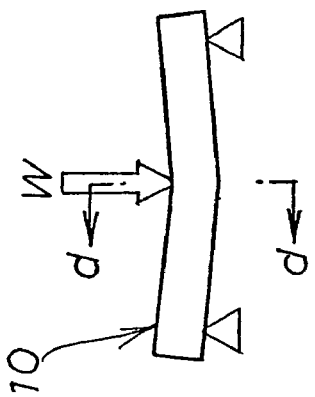
Figure 5E:
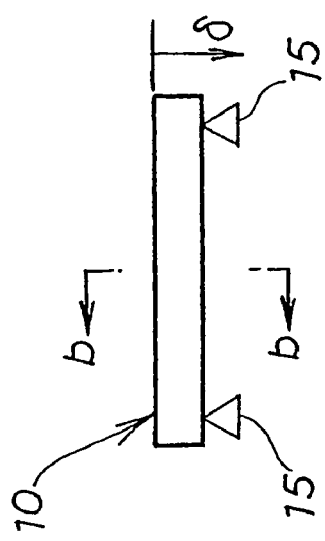
Figure 5B:
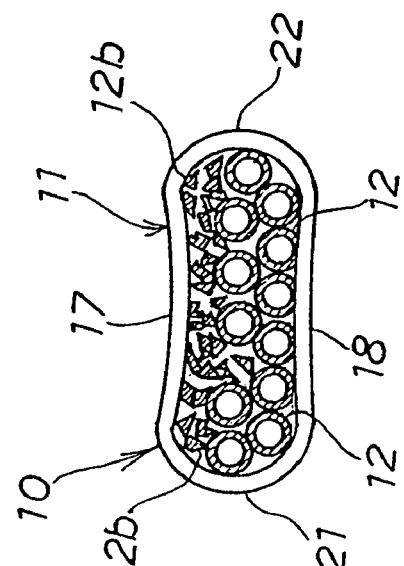

FIG. 5B shows a cross section of the state in which the structural member 10 is filled with the granular materials 12.

Figure 5D:
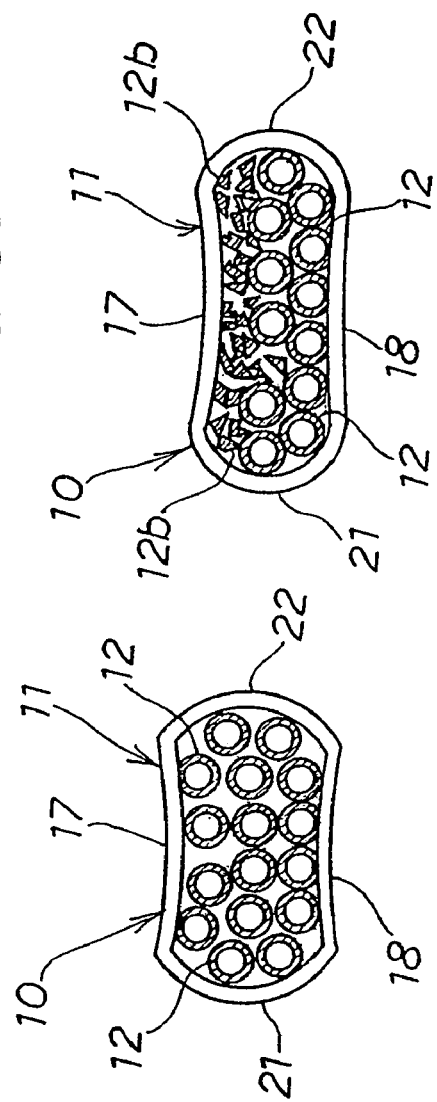

As shown in FIG. 5C, when a load W is applied to the structural member 10 in the direction of an arrow, the structural member 10 is deflected downwardly, and as shown in FIG. 5D, the granular materials 12 between a top side 17 and a bottom side 18 of the structural member 10 are compressed and lateral sides 21 and 22 of the structural member 10 are swollen outwardly, whereby the granular materials 12 travel sideways.

Figure 5F:
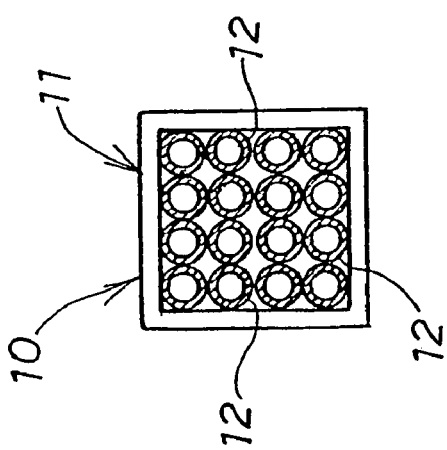

As shown in FIG. 5E, when the load W is further applied to the structural member 10, the structural member 10 is further deformed, and as shown in FIG. 5F, the structural member 10 is crushed to a further extent in the vertical direction, and the lateral sides 21 and 22 are swollen sideways to a further extent. The granular materials 12 in the vicinity of the top side 17 are collapsed by a pressure rise in the interior of the structural member 10, whereby an excessive pressure rise can be prevented.

Accordingly, unlike the prior art, damage to the skeleton member due to a pressure rise inside the structural member does not occur, and the load W shown in FIG. 5E can be prevented from sharply lowering.

Figure 6A:
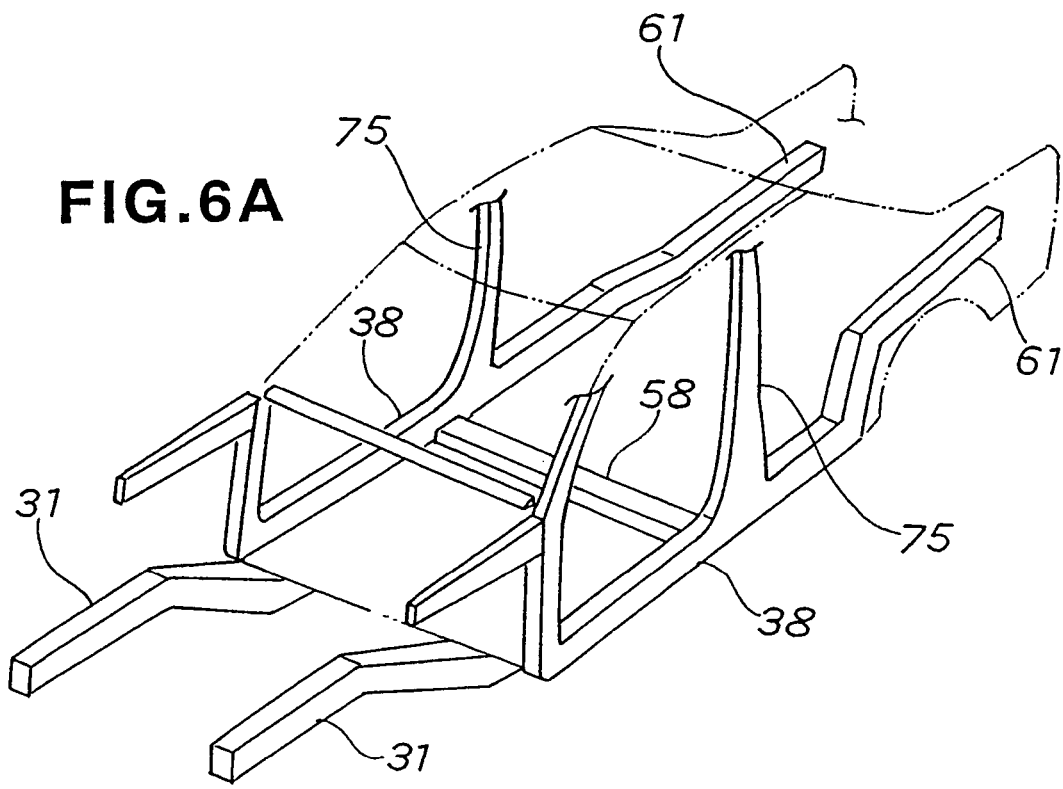
FIGS. 6A and 6B are perspective views showing portions of a vehicle skeleton structure to which the vehicle skeleton structure according to the invention is to be applied.
Figure 6B:
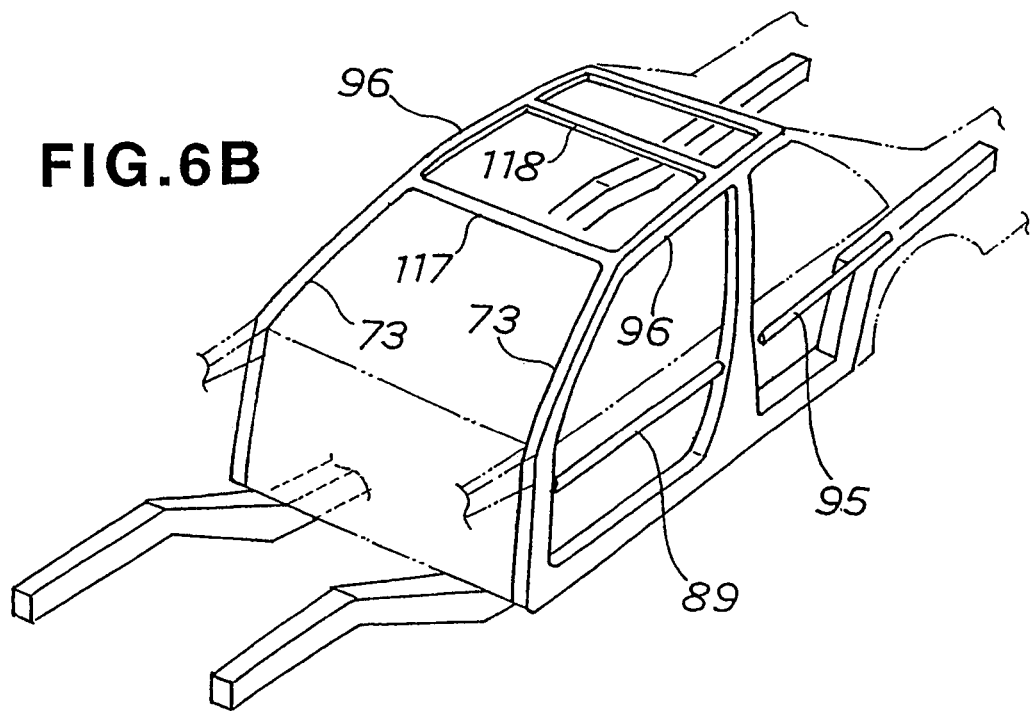

FIGS. 6A and 6B show portions of the vehicle skeleton structure according to the invention, to which the above-described structural member is to be applied.

As shown in FIG. 6A, the skeleton structure according to the invention is applied to front side frames 31, 31 disposed below the opposite lateral sides of an engine located in the front portion of a vehicle body, side sills 38, 38 disposed below the opposite lateral sides of a vehicle chamber, a front floor cross member 58 passed between left and right side sills 38, 38, center pillars 75, 75 erected from the respective side sills 38, 38, and rear frames 61, 61 extended rearwardly from the respective side sills 38, 38.

Furthermore, as shown in FIG. 6B, the skeleton structure according to the invention is applied to left and right front pillars 73, 73, front door beams 89 and rear door beams 95 respectively provided in left and right front doors 89a and left and right rear doors 95a, left and right roof side rails 96, 96 provided on the opposite lateral sides of a roof, and roof rails 117, 118 passed between the left and right roof side rails 96, 96.

FIGS. 7A to 7E respectively show first to fifth examples in each of which the vehicle skeleton structure according to the invention is adopted in a front side frame. In front side frames 31A to 31D according to the first to fourth examples, their skeleton members are directly filled with the granular materials 12, and in a front side frame 31E according to the fifth example, a filling member previously filled with the granular materials 12 is fitted in its skeleton member.

Figure 7A:
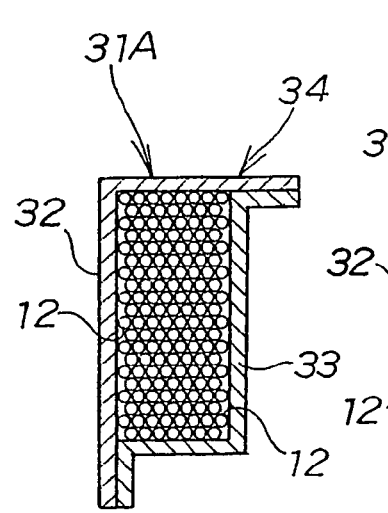
FIGS. 7A to 7E are cross-sectional views showing a plurality of examples in each of which the vehicle skeleton structure according to the invention is adopted in the front side frame of a vehicle.

The front side frame 31A according to the first example shown in FIG. 7A constitutes a skeleton member 34 which is formed of an outer panel 32 and an inner panel 33 which is provided closer to an engine room than to this outer panel 32. This skeleton member 34 is filled with the granular materials 12. When the front side frame 31A is to be filled with the granular materials 12, the front side frame 31A may be filled with the granular materials 12 in whole along the length thereof, or the front side frame 31A may be filled with the granular materials 12 in part along the length thereof; that is to say, two separating walls may be provided in the front side frame 31A in such a manner as to be spaced with a predetermined distance part from each other in the longitudinal direction and the space between these two separating walls may be filled with the granular materials 12. Portions which will be described later may be similarly constructed.

Figure 7B:
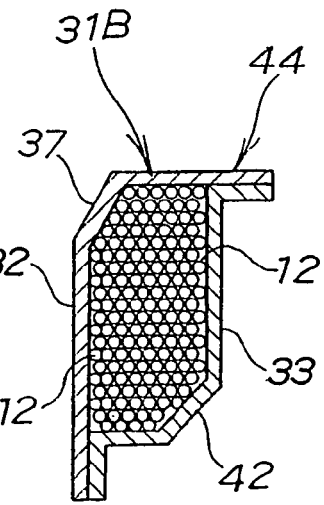

The front side frame 31B according to the second example shown in FIG. 7B constitutes a skeleton structure 44 which is formed of an outer panel 32 having an inclined surface 37 and an inner panel 33 which is provided closer to the engine room than to the outer panel 32 and has an inclined surface 42. This skeleton structure 44 is filled with the granular materials 12.

Figure 7C:
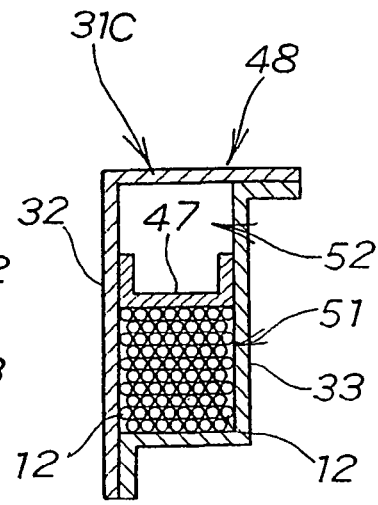

The front side frame 31C according to the third example shown in FIG. 7C constitutes a skeleton structure 48 which is formed of an outer panel 32, an inner panel 33 and a separating wall 47 which is secured to the inside of each of these outer panel 32 and inner panel 33. Of a first chamber 51 and a second chamber 52 which are separated from each other by the separating wall 47 between the outer panel 32 and the inner panel 33, the first chamber 51 is filled with the granular materials 12.

Figure 7D:
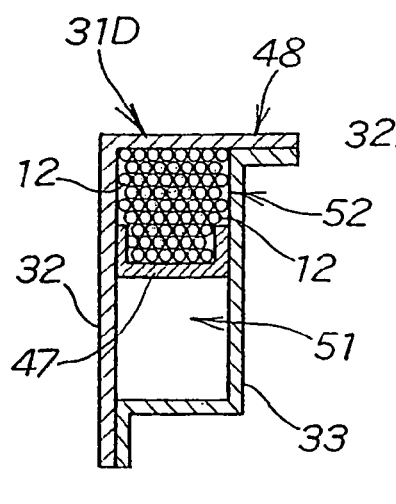

In the front side frame 31D according to the fourth example shown in FIG. 7D, the second chamber 52 of the front side frame 31C shown in FIG. 7C is filled with the granular materials 12.

Figure 7E:
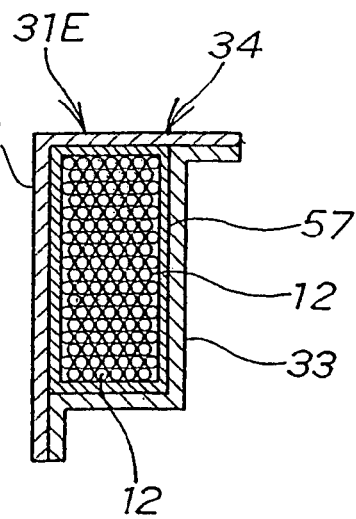

The front side frame 31E according to the fifth example shown in FIG. 7E is a member representative of an example in which a filling member 57 in which the granular materials 12 are previously enclosed is fitted in the inside of the skeleton member 34. Namely, the skeleton member 34 is filled with the granular materials 12 via the filling member 57.

FIGS. 8A to 8D show first to fourth examples in each of which the vehicle skeleton structure according to the invention is adopted in a rear frame. In each of rear frames 61A to 61D which are the first and second examples, the skeleton member is directly filled with the granular materials 12.

Figure 8A:
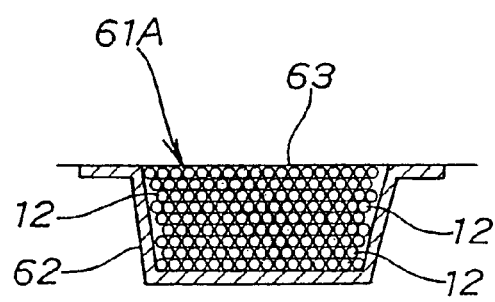
FIGS. 8A to 8D are cross-sectional views showing a plurality of examples in each of which the vehicle skeleton structure according to the invention is adopted in the rear frame of the vehicle.

In the rear frame 61A which is the first example shown in FIG. 8A, there is shown an example in which the space between a lower panel 62 and a rear floor panel 63 provided at a position above this lower panel 62 is filled with the granular materials 12.

Figure 8B:
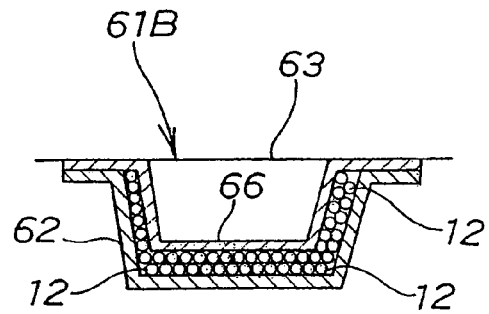

In the rear frame 61B which is the second example shown in FIG. 8B, there is shown an example in which the space between the lower panel 62 and a sub-lower panel 66 secured at a position above the lower panel 62 is filled with the granular materials 12.

Figure 8C:
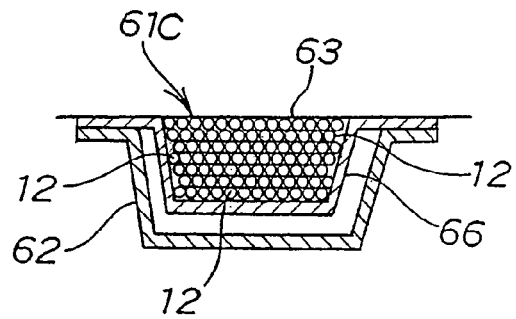

In the rear frame 61C which is the third example shown in FIG. 8C, there is shown an example in which the space between the sub-lower panel 66 secured at a position above the lower panel 62 shown in FIG. 8B and a rear floor panel 63 provided at a position above this sub-lower panel 66 is filled with the granular materials 12.

Figure 8D:
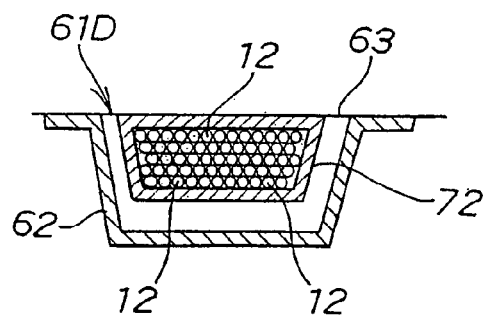

In the rear frame 61D which is the third example shown in FIG. 8D, there is shown an example in which a filling member 72 is disposed in the space surrounded by the lower panel 62 and the rear floor panel 63 and the filling member 72 is filled with the granular materials 12.

FIGS. 9A to 9F show first to sixth examples in each of which the vehicle skeleton structure according to the invention is adopted in a center pillar. In each of center pillars 75A to 75E which are the first to fifth examples, the skeleton member is directly filled with the granular materials 12 in a non-solidified state, and in a center pillar 75F which is the sixth example, there is shown an example in which a filler member previously filled with the granular materials 12 is fitted in the skeleton member.

In the center pillar 75A which is the first example shown in FIG. 9A, there is shown an example in which an skeleton member 78 is formed of an outer panel 76 and an inner panel 77 which is disposed on the vehicle chamber side of this outer panel 76 and the skeleton member 78 is directly filled with the granular materials 12.

The center pillar 75B which is the second example shown in FIG. 9B is a skeleton member 80 formed by securing a reinforcing member 79 between the outer panel 76 and the inner panel 77. The space between the reinforcing member 79 and the outer panel 76 is filled with the granular materials 12.

In the center pillar 75C which is the third example shown in FIG. 9C, there is shown an example in which the space between the reinforcing member 79 shown in FIG. 9B and the inner panel 77 is filled with the granular materials 12.

In the center pillar 75D which is the fourth example shown in FIG. 9D, there is shown an example in which a center pillar garnish 84 is secured to the vehicle chamber side of the skeleton member 78 and the space between this center pillar garnish 84 and the skeleton member 78 is directly filled with the granular materials 12.

In the center pillar 75E which is the fifth example shown in FIG. 9E, there is an example in which a center pillar garnish 91 provided with a plurality of ribs 87, 88 are secured to the vehicle chamber side of the skeleton member 78 and the space between the center pillar garnish 91 and the skeleton member 78 is filled with the granular materials 12.

In the center pillar 75F which is the sixth example shown in FIG. 9F, the center pillar garnish 84 is secured to the vehicle chamber side of the skeleton member 78 and a filling member 94 which is previously filled with the granular materials 12 is fitted in the space between these center pillar garnish 84 and skeleton member 78.

FIGS. 10A to 10E show first to fifth examples in each of which the vehicle skeleton structure according to the invention is adopted in a roof side rail. In each of roof side rails 96A to 96E which are the first to fifth examples, the skeleton member is directly filled with the granular materials 12.

The roof side rail 96A which is the first example shown in FIG. 10A constitutes a skeleton member 101 which is formed of an outer panel 97 and an inner panel 98 disposed at the vehicle chamber side of this outer panel 97. This skeleton member 101 is directly filled with the granular materials 12.

The roof side rail 96B which is the second example shown in FIG. 10B is a skeleton member 105 which is constructed in such a manner that a reinforcing member 104 is secured between the outer panel 97 and the inner panel 98. The space between the reinforcing member 104 and the outer panel 97 is directly filled with the granular materials 12.

In the roof side rail 96C which is the third example shown in FIG. 10C, there is shown an example in which the space between the reinforcing member 104 shown in FIG. 10B and the inner panel 98 is directly filled with the granular materials 12.

In the roof side rail 96D which is the fourth example shown in FIG. 10D, there is shown an example in which a roof-side rail garnish 111 is secured to the vehicle chamber side of the skeleton member 101 and the space between the roof-side rail garnish 111 and the skeleton member 101 is directly filled with the granular materials 12.

In the roof side rail 96E which is the fifth example shown in FIG. 10E, there is shown an example in which the roof-side rail garnish 111 shown in FIG. 10D is provided with a plurality of ribs 114 and the space between this roof-side rail garnish 111 and the skeleton member 101 is directly filled with the granular materials 12.

FIGS. 11A to 11G show a plurality of other examples of a granular material according to the invention.

Figure 11A:
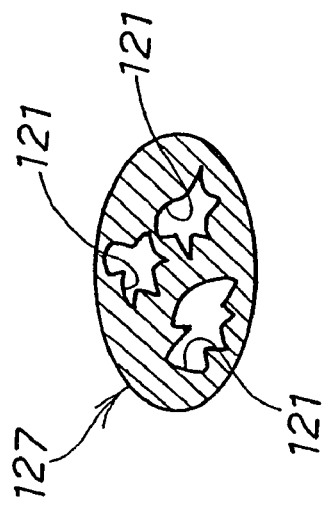
FIGS. 11A to 11G are views showing a plurality of embodiments of a granular material according to the first embodiment.

A granular material 122 which is the first example shown in FIG. 11A is a porous indefinite granular material which forms an indefinite shape and has a plurality of independent hole portions 121.

Figure 11B:
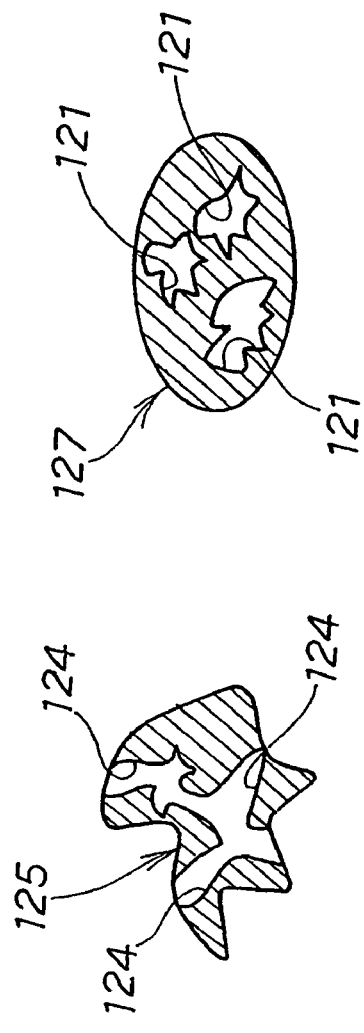

In the second example shown in FIG. 11B, there is shown a porous indefinite granular material 125 having a plurality of hole portions 124 which communicate with one another.

Figure 11C:
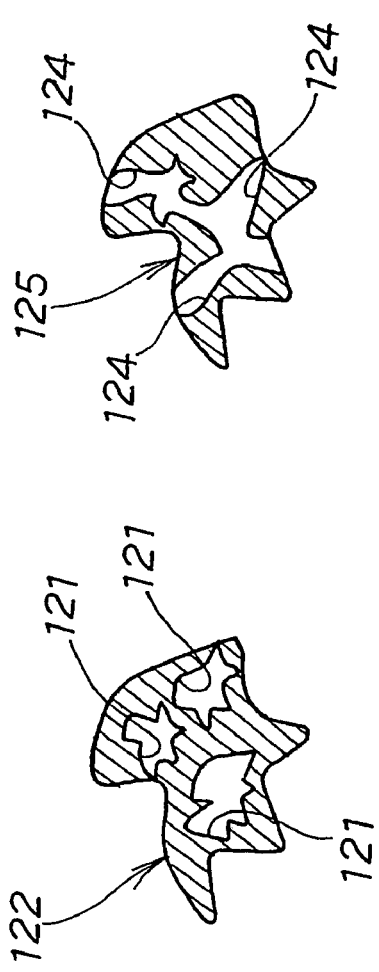

In the third example shown in FIG. 11C, there is a porous definite (in FIG. 11C, elliptic) granular material 127 having the plurality of independent hole portions 121.

Figure 11D:
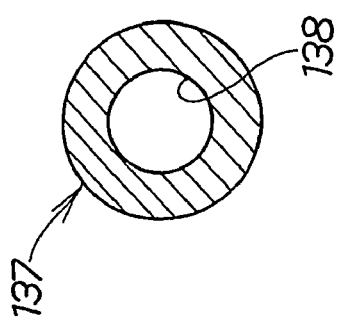

In the fourth example shown in FIG. 11D, there is a porous definite (in FIG. 11D, elliptic) granular material 131 having the plurality of independent hole portions 124 which communicate with one another.

Figure 11E:
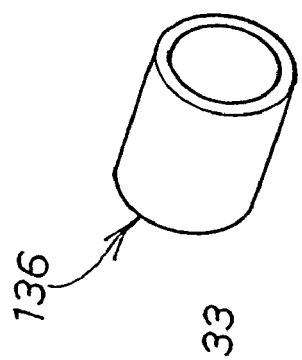

In the fifth example shown in FIG. 11E, there is shown a granular material 134 having a star-like external shape with a hollow portion 133.

Figure 11F:
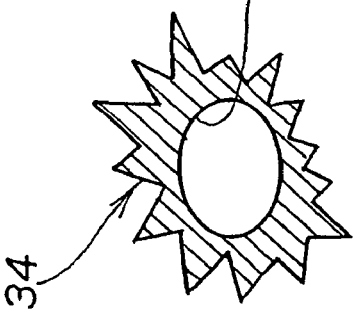

In the sixth example shown in FIG. 11F, there is shown a pipe-shaped granular material 136.

Figure 11G:
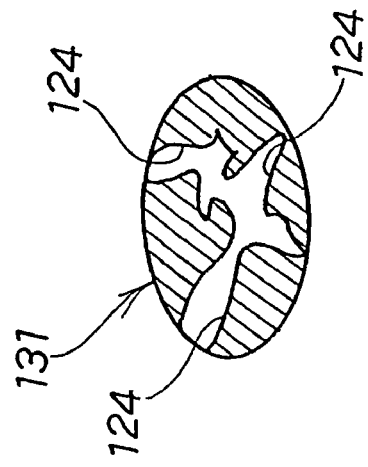

In the seventh example shown in FIG. 11G, there is shown a spherical granular material 137 having a hollow portion 138.

FIG. 12 is a graph showing the results of crush tests of structural members according to the invention, and the vertical axis represents the load P which is an axial compressive load, while the horizontal axis represents the amount of deformation λ according to axial compression.

An embodiment 1 is a structural member filled with hollow granular materials. An embodiment 2 is a skeleton member filled with porous granular materials (the granular materials 122 shown in FIG. 11A). A comparative example 1 is a structural member which is a sample A made of only the skeleton structure shown in FIG. 16C that is not filled with a filling material. A comparative example 2 is a structural member which is the sample C shown in FIG. 16C and filled with solid grains. A comparative example 3 is a structural member which is the sample B shown in FIG. 16C and filled with a foamed material.

As compared with the comparative examples 1 to 3, in the embodiment 1 and the embodiment 2, the load P does not sharply increase in an early stage of deformation, and it is possible to stably maintain a large load P and also to obtain a large amount of deformation λ. Namely, it is possible to increase the integral of the load P from zero to maximum in terms of the amount of deformation λ, whereby it is possible to obtain large absorption energy.

Figure 13:
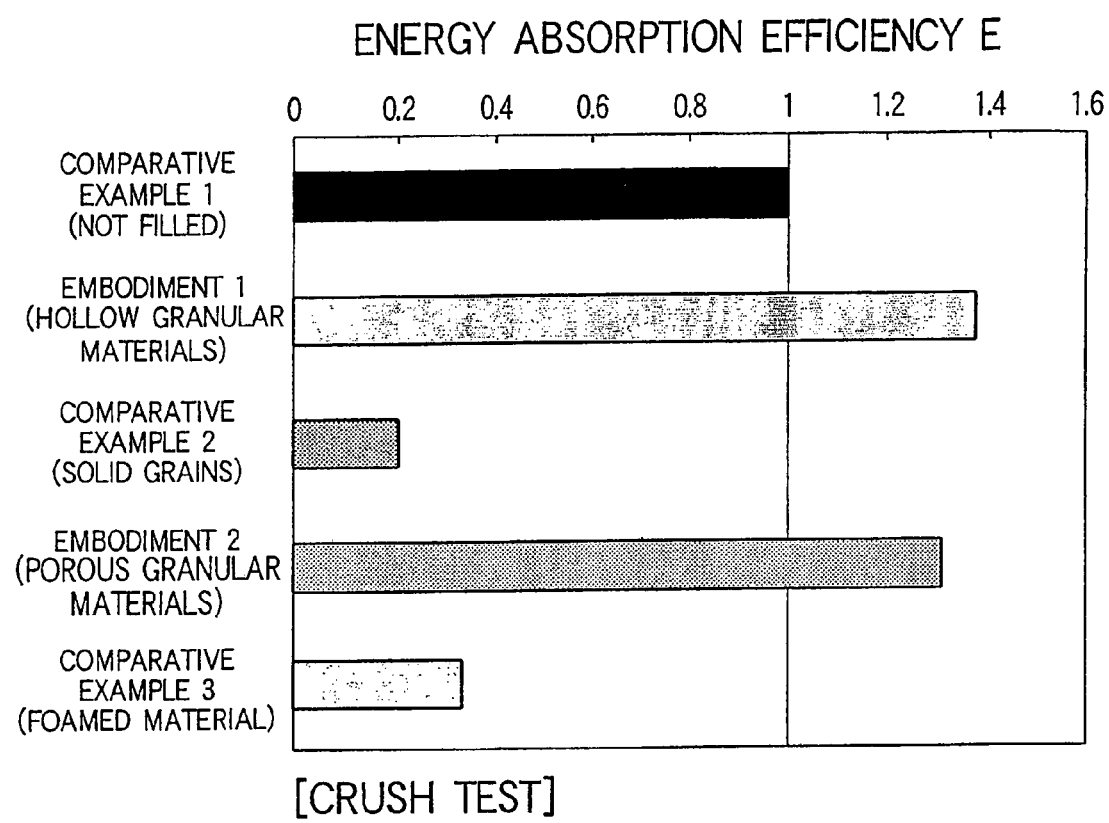
FIG. 13 is a graph showing energy absorption efficiencies in the crush tests of structural members according to the invention.

FIG. 13 is a graph showing energy absorption efficiencies in the crush tests of structural members according to the invention. Specifically, FIG. 13 comparatively shows the energy absorption efficiency E of each of the embodiment 1, the embodiment 2, a comparative example 2 and a comparative example 3, where the energy absorption efficiency E of the structural member of the comparative example 1 that is not filled with a filling material is 1. Incidentally, the energy absorption efficiency E is a value obtained by dividing absorbed energy by the weight of a structural member.

The energy absorption efficiency E of each of the embodiment 1 and the embodiment 2 is greatly larger than 1, and exhibits the effect of the hollow granular materials and the porous granular materials.

Figure 14:
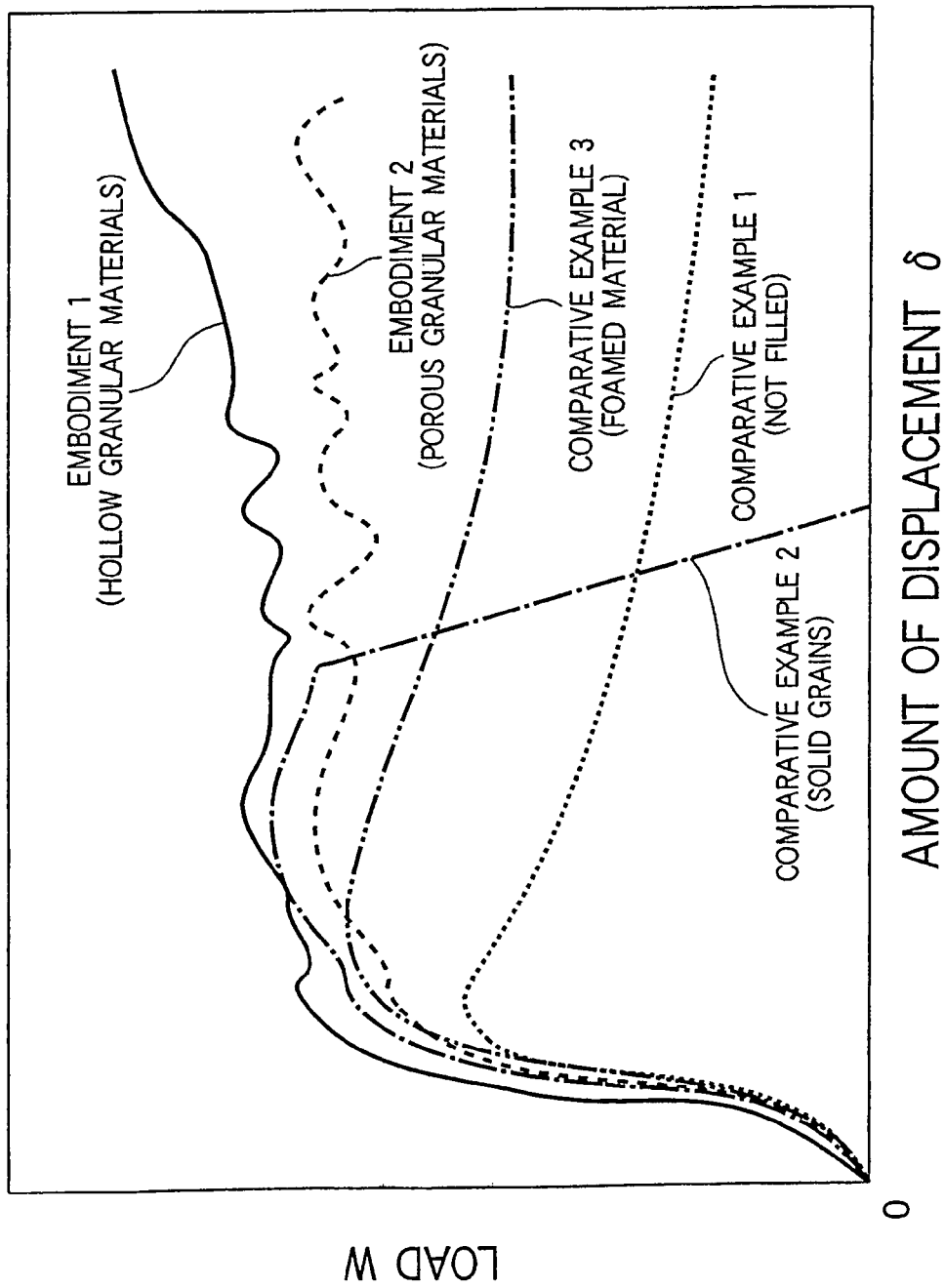
FIG. 14 is a graph showing the results of bending tests of structural members according to the invention as well as comparative examples.

FIG. 14 is a graph showing the results of bending tests of structural members according to the invention, and the vertical axis represents the load W which is made to act perpendicularly to the axis of a structural member, while the horizontal axis represents the amount of displacement δ, of the structural member due to the load W.

As the structural members, there are shown the embodiment 1 (hollow granular materials), the embodiment 2 (porous granular materials), the comparative example 1 (sample A), the comparative example 2 (sample C) and the comparative example 3 (sample B) all of which have been described with reference to FIG. 12.

In the embodiment 1 and the embodiment 2, it is possible to maintain the large load W at a nearly constant level from an early stage of deformation to a later stage of deformation, and it is possible to absorb large energy during deformation.

As described above with reference to FIGS. 2, 9A, 9D and 11A, the invention is characterized in that the space in the center pillar 75A, or the space surrounded by the center pillar 75A and the surrounding center pillar garnish 84, or both the space in the center pillar 75A and the space surrounded by the center pillar 75A and the surrounding center pillar garnish 84 are directly filled with the granular materials 12 having the hollow portions 12a and the granular materials 12, or are fitted with a filling member previously filled with the granular materials 12 having the hollow portions 12a and the granular materials 12.

Then, a solidified granular material which is disposed to fill a structural member according to a second embodiment of the invention will be described with reference to FIGS. 15 to 19.

Figure 15:
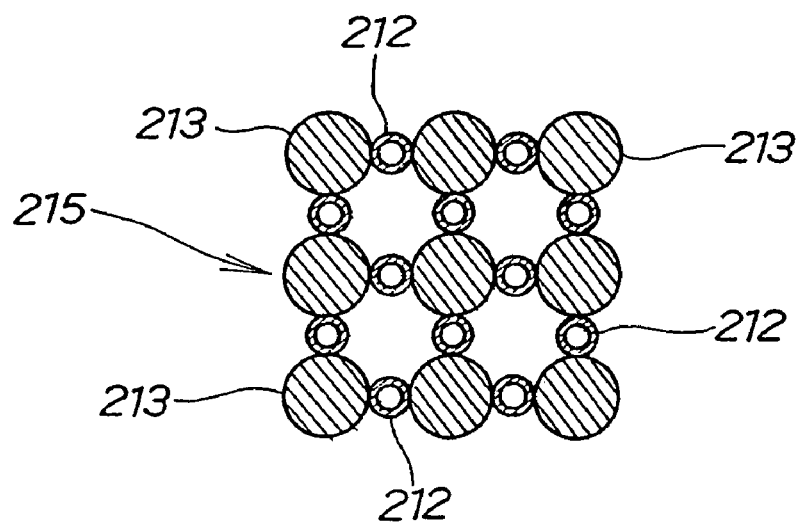
FIG. 15 is a cross-sectional view of a solidified granular material disposed to fill the skeleton member according to the second embodiment of the invention.

FIG. 15 shows a cross-sectional view of a solidified granular material disposed to fill the structural member according to the second embodiment of the invention. This solidified granular material 215 is made of hollow resin-made first granular materials 212 and solid second granular materials 213. Adjacent ones of the second granular materials 213 are bonded to one another by the above-described first granular materials 212. Actually, the first granular materials 212 fill the second granular materials 213 in a nearly dense state, but are coarsely illustrated for the convenience of description.

Figure 16:
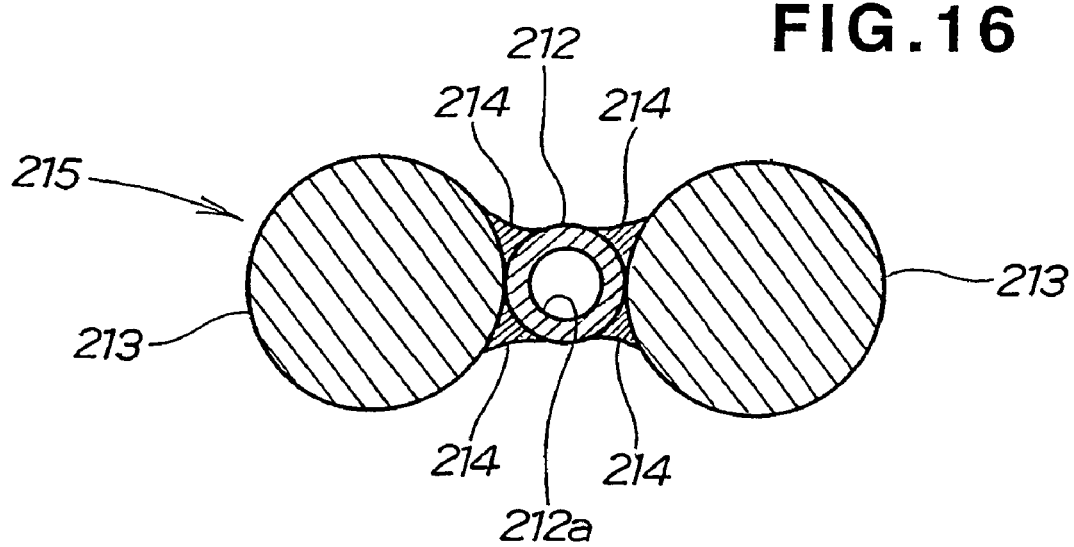
FIG. 16 is a magnified view of part of the solidified granular material shown in FIG. 15.

FIG. 16 is a magnified view of a solidified granular material according to the second embodiment of the invention. The solidified granular material 215 is a member in which adjacent ones of the second granular materials 213 are bonded together by melting and then solidifying the first granular materials 212. Reference numeral 212a denotes a hollow portion of the first granular materials 212, and reference numeral 214 denotes a solidified portion formed by the solidification of the first granular materials 212.

Then, the state in which the above-described solidified granular material 215 is deformed by a load being applied thereto will be described with reference to FIGS. 17A and 17B.

In FIG. 17A, during a vehicle collision, when the load P acts on a structural member 210 from the outside, the load P is transmitted to the solidified granular material 215 via a skeleton member 211 and the solidified granular material 215 is deformed as shown in FIG. 17B.

Namely, in an early stage of deformation of the solidified granular material 215, the first granular materials 212 and the second granular materials 213 are slightly deformed. As the load is further applied and deformation proceeds, the deformation of the hollow first granular materials 212 becomes larger with the second granular materials 213 hardly deformed, and the first granular materials 212 near the portion of the structural member 210 to which the load is applied are collapsed. As the load P further continues to act, the collapse of the first granular materials 212 gradually proceeds toward the bottom side of the structural member 210.

A collapsed portion 212b resulting from the collapse of the first granular material 212 generates large frictional force with an adjacent collapsed portion 212b and an adjacent second granular material 213. When the solidified granular material 215 is being deformed, this frictional force becomes large resistance and absorbs large impact energy during the collision. Since the collapse of the first granular materials 212 gradually travels, impact energy is stable and efficiently absorbed.

Figure 18B:
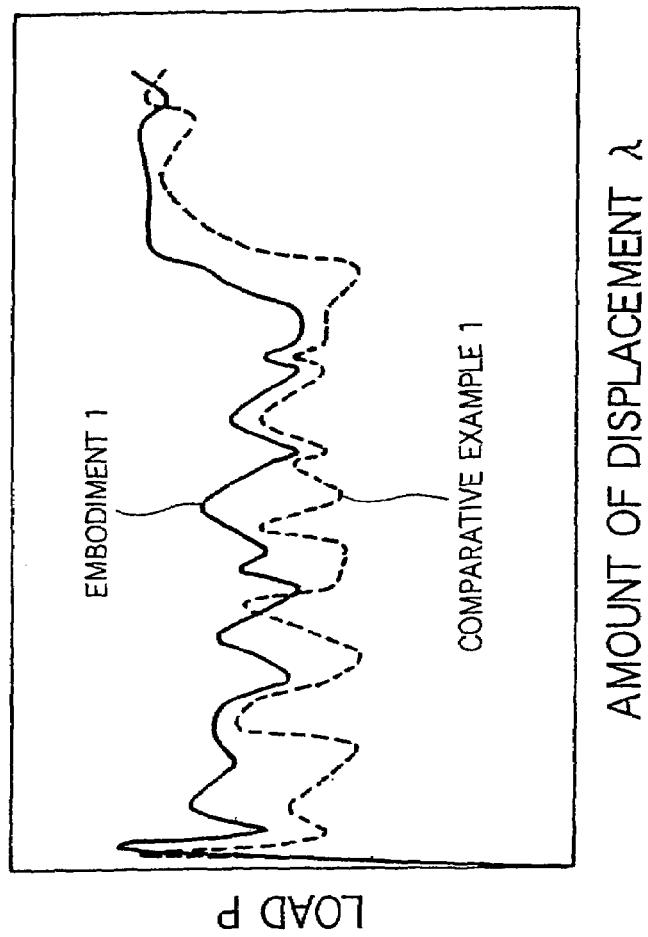
FIGS. 18A and 18B are, respectively, a view of the state in which a load is applied for performing a crush test of the structural member having the skeleton member filled with the solidified granular material shown in FIG. 15, and a graph showing the result of the crush test and a comparative example.
Figure 18A:
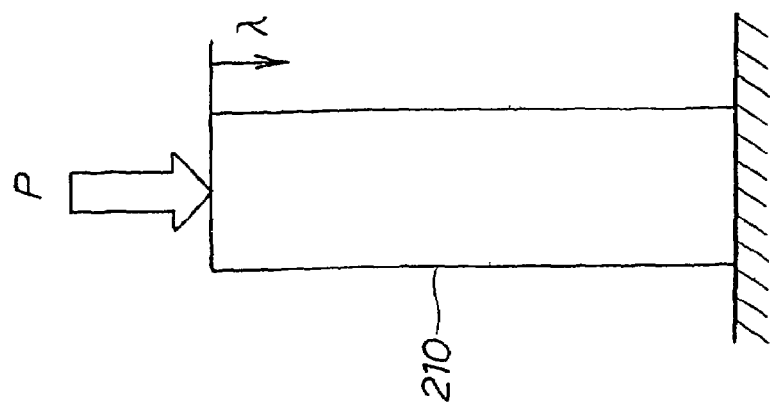

FIGS. 18A and 18B show the contents of a crush test of a structural member according to the second embodiment. In FIG. 18A, the amount of deformation λ of the structural member 210 when the load P which is a compressive load is applied to the structural member 210 in the axial direction thereof is found. FIG. 18B is a graph showing the relationship between the load P and the amount of deformation λ, and the vertical axis represents the load P, while the horizontal axis represents the amount of deformation λ.

As shown in FIG. 18B, the comparative example 1 is a structural member having a structural member filled with solid granular materials, and the granular materials are not solidified. As compared with such comparative example 1, in the embodiment which is the structural member 210 fitted with the solidified granular material 215 (refer to FIG. 15) according to the invention, it can be seen that the load P increases compared to the comparative example 1 and impact energy absorbing performance is improved.

Figure 19:
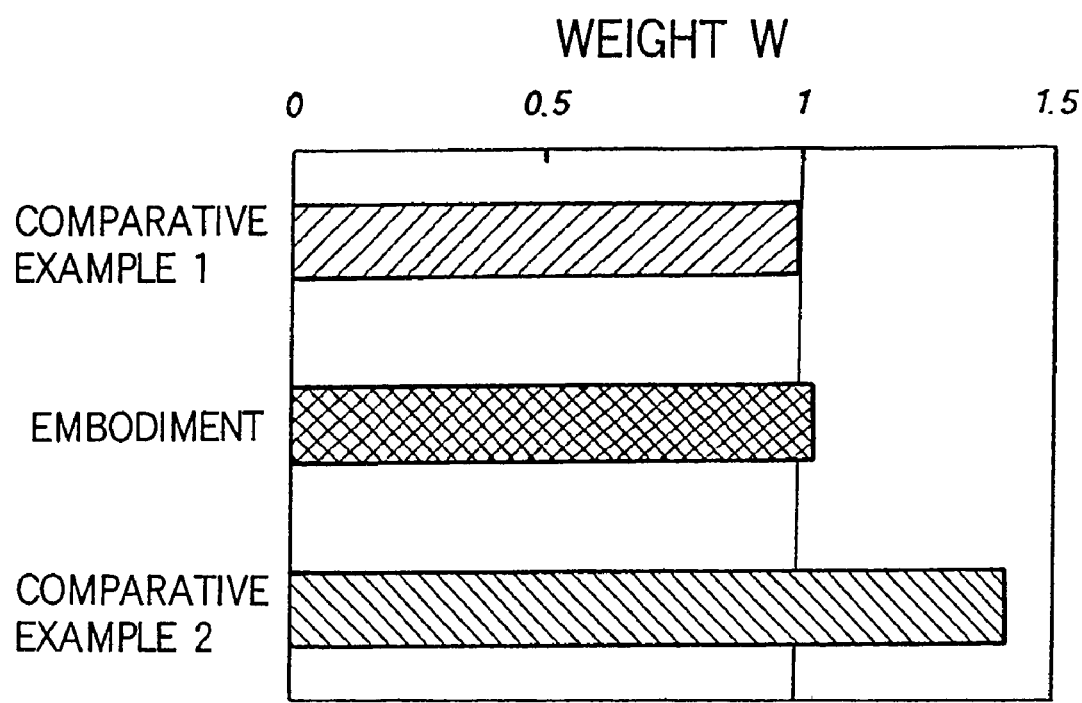
FIG. 19 is a graph showing the weight of the structural member filled with the solidified granular material shown in FIG. 15, together with comparative examples.
Figure 20A:
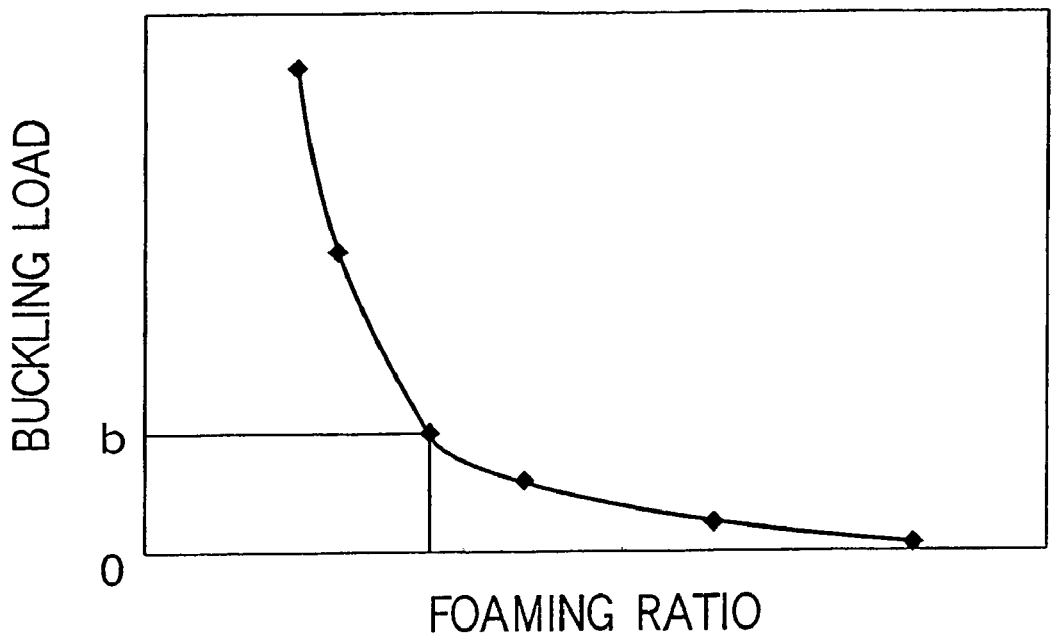
FIG. 20A is a graph showing the relationship between foaming ratio and buckling load when a compressive load is axially applied to a conventional structural member having a skeleton member filled with a foamed material.
Figure 20B:
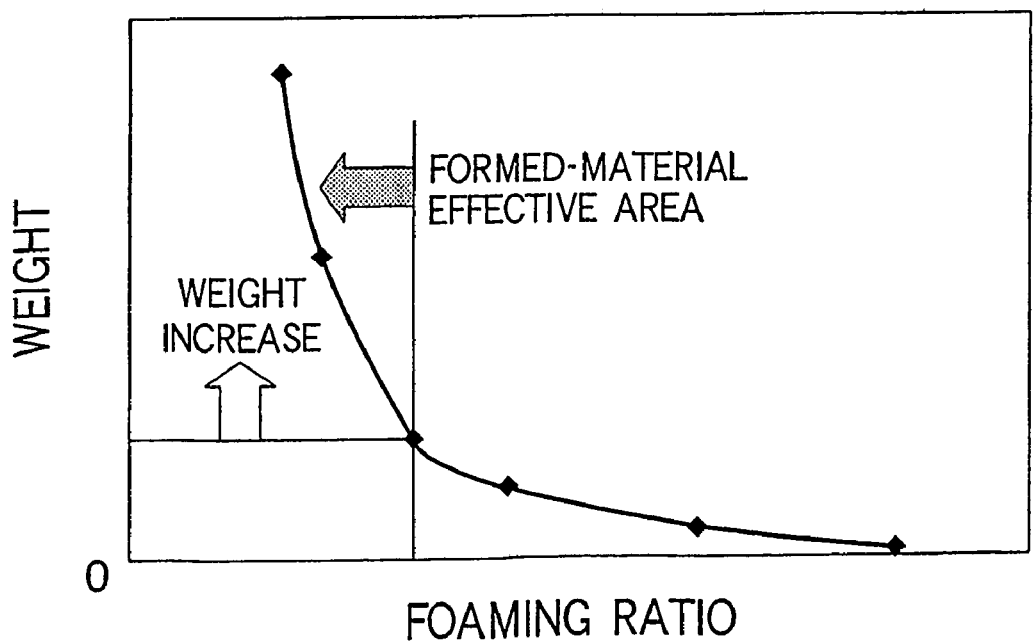
FIG. 20B is a graph showing the relationship between the foaming ratio and the weight of the structural member.
Figure 21A:
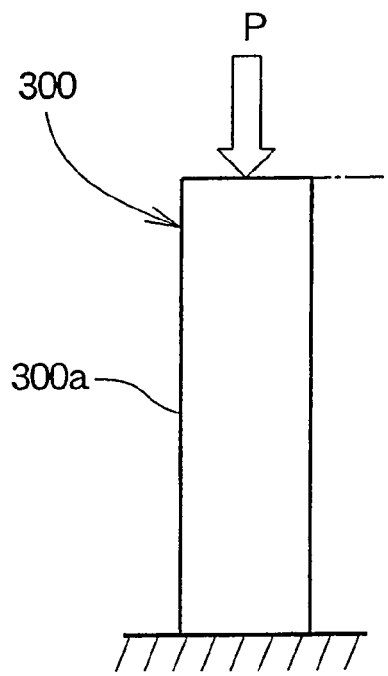
FIGS. 21A and 21B show the state of deformation of a conventional structural member having a tubular skeleton member filled with a foamed material or solid grains when a compressive load is applied to the conventional structural member in the axial direction.
Figure 21B:
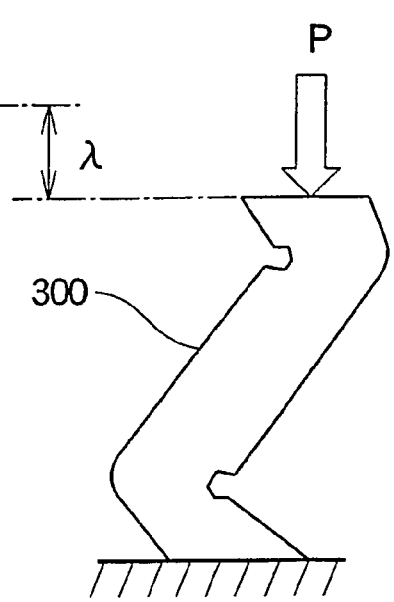
Figure 21C:
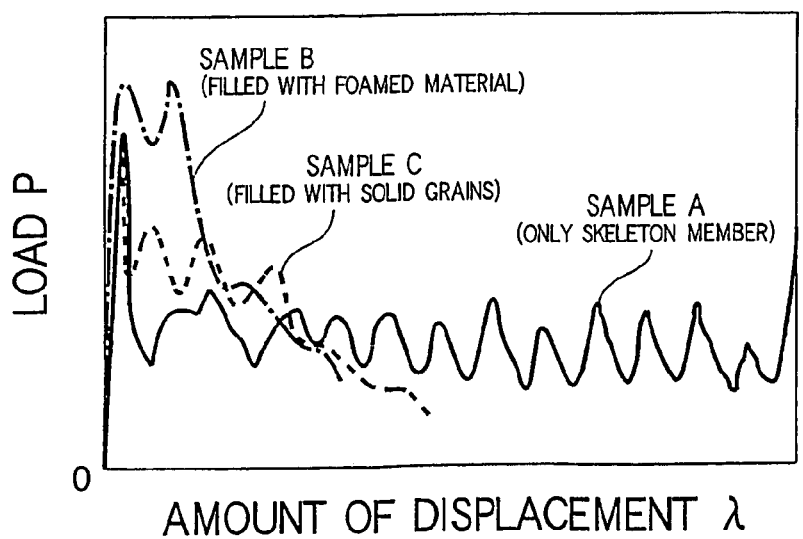
FIG. 21C is a graph showing the relationship between the amount of deformation of the structural member and the compressive load.
Figure 27:
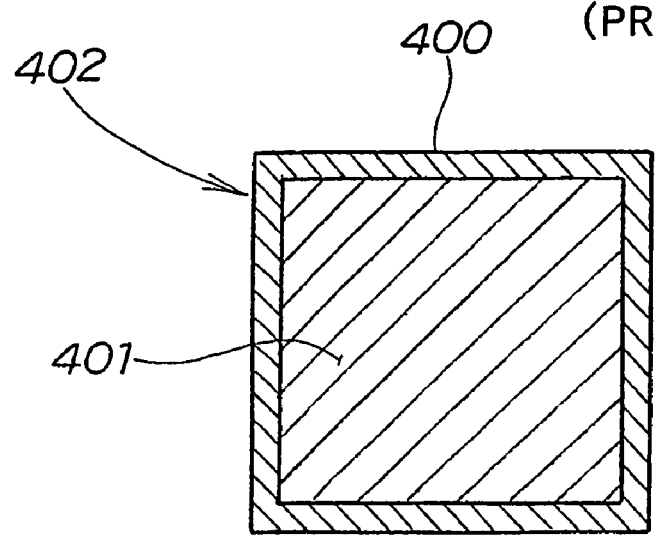
FIG. 27 is a cross-sectional view of a structural member having a skeleton member filled with a conventional solidified granular material.
Figure 28:
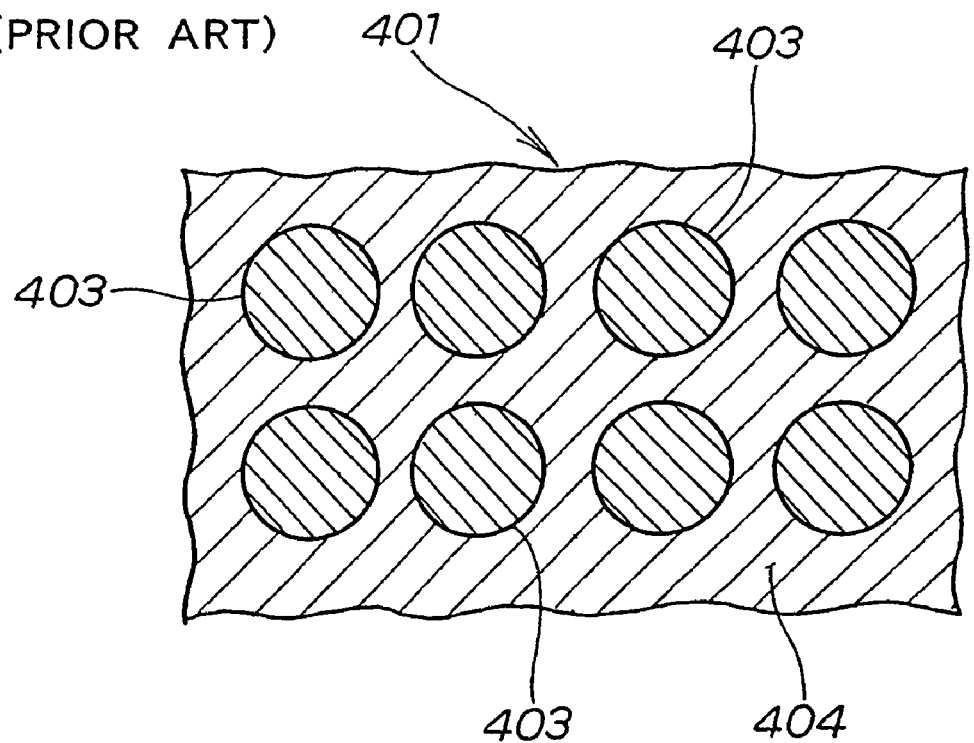
FIG. 28 is a magnified cross-sectional view of the conventional solidified granular material shown in FIG. 27.
Figure 29:
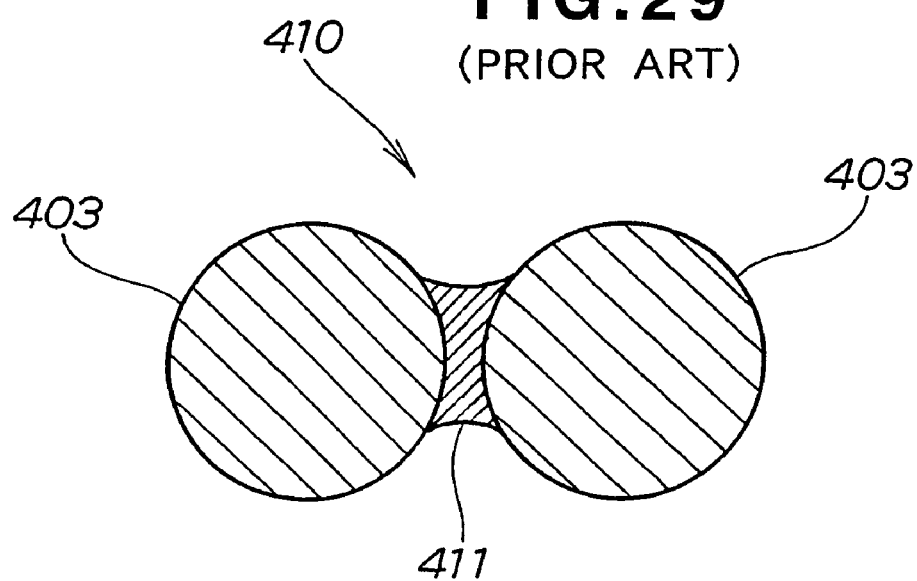
FIG. 29 is a cross-sectional view showing the state in which granular materials are bonded to one another by a conventional crosslinking liquid film.
Figure 30:
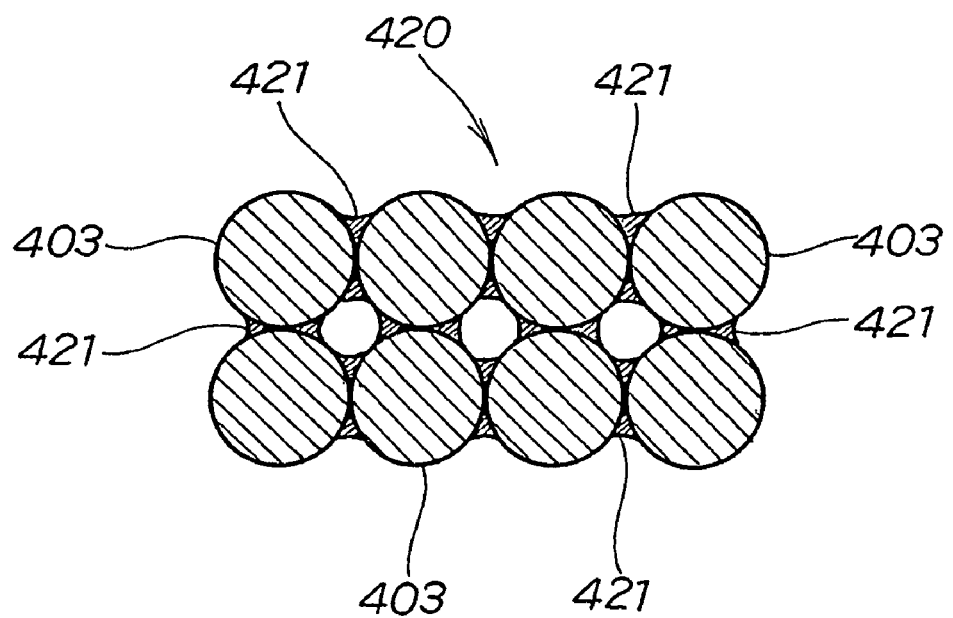
FIG. 30 is a cross-sectional view showing the state in which granular materials are bonded to one another by melting the surfaces of the conventional granular materials.

FIG. 19 is a graph comparatively showing the weight of the structural member according to the second embodiment and the weights of comparative examples. Assuming that the weight W of the comparative example 1 (the structural member filled with only the solid granular materials shown in FIG. 18B) is 1, the weight W of the structural member filled with the solidified granular material 215 (refer to FIG. 2) of the present embodiment merely slightly exceeds 1, and the increase of the weight is small with respect to the comparative example 1.

The comparative example 2 is a structural member whose interior is filled with urethane resin, and the increase of the weight W is large with respect to the present embodiment.

The second granular materials 213 of the embodiments shown in FIGS. 15, 16, 17A and 17B have been described above with reference to solid granular materials by way of example, but the second granular materials 213 in the invention are not limited to solid granular materials and may also be those shown in FIGS. 11A to 11G as the first embodiment, for example, indefinite porous materials, definite porous materials, star-shaped materials having hollow portions, pipe-shaped materials or spherical granular materials having hollow portions.

Accordingly, since the second granular materials 213 are formed as hollow or porous granular materials, a further reduction in the weight of the structural member can be realized in combination with the first granular materials 212 (refer to FIG. 15) which bond the second granular materials 213.

The solidified granular material 215 according to the second embodiment is adopted in the vehicle skeleton structures shown in FIGS. 6A and 6B.

As described above in connection with FIGS. 15, 17A and 17B, in the first place, the invention of these embodiments is characterized in that in a structure in which the skeleton member 210 and/or the space surrounded by the skeleton member 210 and the surrounding panel member are filled with granular materials, the granular materials are made of the hollow first granular materials 212 and the second granular materials 213 and adjacent ones of the hollow second granular materials 213 are bonded to one another by the first granular materials 212.

By bonding the adjacent ones of the second granular materials 213 to one another with the hollow first granular materials 212 in this manner, it is possible to reduce the weight of the structural member 210. In addition, the mutual bonding of the second granular materials 213 can be made firm by the melting of the first granular materials 212. Accordingly, when the skeleton member 210 receives impact, the first granular materials 212 are collapsed. The collapsed portion 212b resulting from the collapse of these first granular materials 212 generates large frictional force when the solidified granular material 215 is being deformed, whereby large resistance can be obtained to absorbs larger impact energy. Furthermore, since the collapse of the first granular materials 212 gradually travels, impact energy can be stable and efficiently absorbed.

Further, the invention is characterized in that when the skeleton member 210 and/or the space between the skeleton member 210 and the surrounding panel member is to be filled with the solidified granular material 215, the solidified granular material 215 is formed by a step of mixing the resin-made hollow first granular materials 212 and the second granular materials 213 and a step of bonding the first granular materials 212 and the second granular materials 213 by melting surfaces of the first granular materials 212.

According to this solidified granular material forming method, it is possible to firmly bond the first granular materials 212 and the second granular materials 213 by melting the surfaces of the resin-made hollow first granular materials 212, whereby it is possible to form the lightweight large-sized solidified granular material 215. In addition, the surfaces of the resin-made first granular materials 212 can be melted at a low temperature, whereby the solidified granular material 215 can be easily formed without the need for equipment such as special heating equipment.

Incidentally, in the invention, when the skeleton member is to be filled with the solidified granular material, the solidified granular material may also be inserted into the skeleton member after having being formed into a predetermined shape. Otherwise, the solidified granular material may be formed by mixing the first and second granular materials, then filling the skeleton member with these mixed granular materials, and subsequently heating the skeleton member.

INDUSTRIAL APPLICABILITY

As described above, according to the invention, an increase in the weight of a skeleton member structure can be restrained by granular materials having hollow portions or porous granular materials. When the skeleton member receives impact, owing to the frictional force among the granular materials and the deformation or the collapse of the granular materials themselves, the deformation of the skeleton member can be made to proceed gradually from a load-acting side and smoothly while a large load is being generated, whereby far larger impact energy can be absorbed more stably. Accordingly, the skeleton member structure of the invention is usefully applicable to skeleton members for railroads, ships, airplanes, motorbikes and the like, and particularly, to skeleton members for automobiles.

The invention claimed is:

1. A skeleton member structure comprising:
   a skeleton member; and
   granular materials having hollow portions or being porous,
   wherein at least one of a space inside the skeleton member and a space defined between the skeleton member and a surrounding panel member is filled with the granular materials, and
   wherein the skeleton member includes a plurality of frames, side sills, cross members, pillars, beams and rails, all being for use on an automobile.

2. The skeleton member structure according to claim 1, wherein the granular materials are filled directly into the space defined by the skeleton member and the surrounding panel or into a filling member which is fitted into the skeleton member.

3. A skeleton member structure comprising:
   a skeleton member; and
   granular materials having hollow portions or being porous,
   wherein at least one of a space inside the skeleton member and a space defined between the skeleton member and a surrounding panel member is filled with the granular materials, and
   wherein the granular materials are first granular materials and further comprising second granular materials, adjacent ones of the second granular materials being bonded to one another by the first granular materials having hollow portions.

4. The skeleton member structure according to claim 3, wherein the first granular materials are made of a resin material.

5. The skeleton member structure according to claim 3, wherein the second granular materials are solid.

6. The skeleton member structure according to claim 3, wherein the second granular materials comprise hollow or porous granular materials.

7. A method for forming a solidified granular material that is filled in at least one of a skeleton member and in a space defined by the skeleton member and a surrounding panel member, the method comprising the steps of:
   mixing first granular materials that are hollow and made of a resin, with second granular materials; and
   bonding adjacent ones of the second granular materials to one another via the first granular materials by melting surfaces of the first granular materials.

8. The skeleton member structure according to claim 1, wherein both the space inside the skeleton member and the space defined between the skeleton member and the surrounding panel member are filled with the granular materials.

9. The skeleton member structure according to claim 8, wherein the granular materials are filled directly into the space surrounded by the skeleton member or into a filling member which is fitted into the skeleton member.

10. A skeleton member structure according to claim 8, wherein the granular materials are first granular materials and further comprising second granular materials, adjacent ones of the second granular materials being bonded to one another by the first granular materials having hollow portions.

11. A skeleton member structure according to claim 10, wherein the first granular materials are made of a resin material.

12. A skeleton member structure according to claim 10, wherein the second granular materials are solid.

13. A skeleton member structure according to claim 10, wherein the second granular materials comprise hollow or porous granular materials.

* * * * *